(12) United States Patent
Wang et al.

(10) Patent No.: US 12,519,554 B2
(45) Date of Patent: Jan. 6, 2026

(54) METHOD FOR ADJUSTING SENDING RATE IN NEAR FIELD COMMUNICATION SCENARIO, APPARATUS, AND SYSTEM

(71) Applicant: Huawei Technologies Co., Ltd., Shenzhen (CN)

(72) Inventors: Wei Wang, Beijing (CN); Yiyang Shao, Beijing (CN); Jie Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 431 days.

(21) Appl. No.: 18/147,509

(22) Filed: Dec. 28, 2022

(65) Prior Publication Data

US 2023/0188230 A1 Jun. 15, 2023

Related U.S. Application Data

(63) Continuation of application No. PCT/CN2021/103498, filed on Jun. 30, 2021.

(30) Foreign Application Priority Data

Jun. 30, 2020 (CN) .......................... 202010624214.1
Jun. 25, 2021 (CN) .......................... 202110714606.1

(51) Int. Cl.
*H04B 17/336* (2015.01)
*H04B 5/20* (2024.01)
(Continued)

(52) U.S. Cl.
CPC ............. *H04B 17/336* (2015.01); *H04B 5/20* (2024.01); *H04L 43/0841* (2013.01); *H04L 43/0864* (2013.01)

(58) Field of Classification Search
CPC .......... H04B 17/336; H04B 5/72; H04B 5/20; H04L 43/0841; H04L 43/0864;
(Continued)

(56) References Cited

U.S. PATENT DOCUMENTS 7,423,970 B2 9/2008 Wang et al.
2002/0194361 A1* 12/2002 Itoh ....................... H04L 47/263
709/224
2008/0043620 A1* 2/2008 Ye ........................... H04L 47/10
370/232

(Continued)

FOREIGN PATENT DOCUMENTS

CN 108293229 A 7/2018
CN 110708725 A 1/2020

OTHER PUBLICATIONS

RFC: 793, Transmission Control Protocol Darpa Internet Program Protocol Specification, Sep. 1981, 91 pages.
(Continued)

*Primary Examiner* — Sun Jong Kim
(74) *Attorney, Agent, or Firm* — Conley Rose, P.C.

(57) ABSTRACT

A method for adjusting a sending rate in a near-field communication scenario includes obtaining, by a sending device, transport layer information of a connection between the sending device and a receiving device, physical layer channel information of a transmit link on which the sending device is located, and physical layer channel information of a receive link on which a receiving device of the data is located, and adjusting a sending rate of a transport layer of the sending device based on the transport layer information, the physical layer channel information of the transmit link, and the physical layer channel information of the receive link.

20 Claims, 12 Drawing Sheets

(51) Int. Cl.
*H04L 43/0829* (2022.01)
*H04L 43/0864* (2022.01)

(58) Field of Classification Search
CPC ...... H04L 1/0002; H04L 47/25; H04W 28/10; H04W 4/80; H04W 28/0236; H04W 28/0875
See application file for complete search history.

(56) References Cited

U.S. PATENT DOCUMENTS

| | | | |
|---|---|---|---|
| 2008/0056662 A1* | 3/2008 | Ikeda | H04N 21/4122 348/E7.071 |
| 2010/0036965 A1* | 2/2010 | Kim | H04L 65/762 709/231 |
| 2015/0065040 A1 | 3/2015 | Zhou et al. | |
| 2017/0163513 A1 | 6/2017 | Kim et al. | |

OTHER PUBLICATIONS

Kashyap Shruthi et al: "Cook over IP: Adapting TCP for Cordless Kitchen Appliances", 2018 IEEE/ACM Third International Conference on Internet-of-Things Design and Implementation (IOTDI), IEEE, Apr. 17, 2018, pp. 1-12, XP033350833.

K. Ramakrishnan et al, The Addition of Explicit Congestion Notification (ECN) to IP, Network Working Group Request for Comments: 3168, Sep. 2001, 63 pages.

Ben-Jye Chang et al, Cross-layer-based adaptive congestion and contention controls for accessing cloud services in 5G IEEE 802.11 family wireless networks, Computer Communications, vol. 106, Issue C, Jul. 1, 2017, 16 pages.

A. Jain et al, Mobile Throughput Guidance Inband Signaling Protocol draft-flinck-mobile-throughput-guidance-04.txt, Internet Engineering Task Force, Mar. 13, 2017, 31 pages.

* cited by examiner

METHOD FOR ADJUSTING SENDING RATE IN NEAR FIELD COMMUNICATION SCENARIO, APPARATUS, AND SYSTEM

CROSS-REFERENCE TO RELATED APPLICATIONS

This application is a continuation application of International Patent Application No. PCT/CN2021/103498, filed on Jun. 30, 2021, which claims priorities to Chinese Patent Application No. 202010624214.1, filed on Jun. 30, 2020 and Chinese Patent Application No. 202110714606.1, file on Jun. 25, 2021. All of the aforementioned patent applications are hereby incorporated by reference in their entireties.

TECHNICAL FIELD

This application relates to the field of communication technologies, and in particular, to a method for adjusting a sending rate in a near-field communication scenario, an apparatus, and a system.

BACKGROUND

At present, data of electronic products held by users increases sharply, and a communication requirement for the electronic products is also raised. In a near-field network environment, intelligent linkage may be implemented between electronic products, for example, video content played by a mobile phone is intelligently switched to a television for playing. Generally, some messages need to be exchanged between the electronic products, to implement intelligent linkage between the electronic products. In an intelligent linkage scenario, a location relationship between electronic products may change with movement of a user, causing a change in communication channel quality. In addition, the electronic products may contend for a radio channel, causing low overall communication efficiency.

To improve communication efficiency between electronic products in a near-field environment and improve a data transmission capability of near-field wireless communication, a plurality of technologies is currently proposed, for example, congestion control based on a packet loss rate, congestion control based on a round trip time (RTT), and network-assisted congestion control implemented at a network layer. The foregoing congestion control technologies may adjust a sending rate of a transport layer of a sender to some extent. However, in a near-field wireless communication scenario, a radio channel is time-varying, and it is difficult for the sender to accurately increase a transmit window to adjust to a proper sending rate of the transport layer. In an example, if the sending rate of the transport layer is low, a throughput is affected, and a link bandwidth cannot be fully used. If the sending rate of the transport layer is high, a large queuing delay or even a packet loss is caused.

It can be learned that, in the near-field wireless communication scenario, in a current transport layer sending rate adjustment solution, performance of sending rate adjustment at the transport layer is poor.

SUMMARY

Embodiments of this application provide a method for adjusting a sending rate in a near-field communication scenario, an apparatus, and a system, to improve sending rate adjustment performance in a near-field wireless communication scenario.

To achieve the foregoing objectives, the following technical solutions are used in embodiments of this application.

According to a first aspect, an embodiment of this application provides a method for adjusting a sending rate in a near-field communication scenario. The method is performed by a sending device of data, a component (for example, a chip) in the sending device, or another component that supports a function of the sending device. The method includes: obtaining transport layer information of a connection, physical layer channel information of a transmit link on which the sending device is located, and physical layer channel information of a receive link on which a receiving device of the data is located, and adjusting a sending rate of a transport layer of the sending device based on the transport layer information, the physical layer channel information of the transmit link, and the physical layer channel information of the receive link.

A near-field communication environment refers to an environment in which a sender and a receiver are directly connected via a wireless network. For example, the receiver and the sender communicate through wireless fidelity direct (WIFI DIRECT) communication, or the sender and the receiver are connected via only a one-hop wireless forwarding device. The wireless forwarding device may be a non-3rd Generation Partnership Project (non-3GPP) device, for example, a WIFI device. Alternatively, the wireless forwarding device may be a 3GPP device, for example, a 4th generation (4G) mobile communication technology base station or a 5th generation (5G) mobile communication technology base station.

The transmit link on which the sending device is located refers to a link over which the sending device directly communicates with a device. The sending device and the device may be referred to as two access devices of the transmit link. The device may be a receiving device, or may be another network device such as a forwarding device. The receive link on which the receiving device is located refers to a link over which the receiving device directly communicates with a device. The receiving device and the device may be referred to as two access devices of the receive link. The device may be a sending device, or may be another network device such as a forwarding device. The physical layer channel information can represent a real status of a physical channel. A link refers to a line from a node to an adjacent node, and there is no other switching node between the two nodes.

Optionally, the transport layer information includes but is not limited to a packet loss rate and an RTT. The transport layer information can reflect a network status change, such as cross traffic, namely, traffic of other users.

The connection refers to a connection between the sending device and the receiving device. The connection may be used for transmitting data between the sending device (sender for short) and the receiving device (receiver for short). In a network, one connection uses one or more paths in a network topology to transmit data. The path includes end devices on which the sender and the receiver are located, and a network device between the sender and the receiver. For example, FIG. 3B is used as an example. In a near-field environment, a connection between a sending device (a mobile phone A) and a receiving device (a mobile phone B) may transmit data through a path such as a path 1. The path 1 includes a mobile phone A, a mobile phone B, and an access point (AP) between the mobile phone A and the mobile phone B.

In a hierarchical model of the network, the sending rate of the transport layer may refer to a rate at which the transport layer sends information to a lower layer (for example, a network layer in an Open Systems Interconnection (OSI) model shown in FIG. 1A) of the transport layer.

According to the foregoing method for adjusting a sending rate, rate adjustment is performed based on the physical layer channel information. First, in combination with the transport layer information at an upper layer and the physical layer information at a bottom layer, a real physical layer rate of a communication link can be matched as much as possible, and a probability of packet loss or queuing caused by mismatch between a sending rate and a physical layer rate of a communication link is reduced. In addition, in the near-field network, the sending device and the receiving device are usually directly connected, or are connected via only a one-hop forwarding device. The sending device can not only obtain the physical layer channel information of the transmit link, but also obtain the physical layer channel information of the receive link by using a sharing mechanism. In other words, the sending device can learn global physical layer channel information of the near-field network, and the sending rate calculated based on the global physical layer channel information is more accurate. Data is transmitted based on the accurate sending rate, so that transmission efficiency can be improved and data sending time can be reduced.

In addition, a higher layer (for example, the transport layer) of a protocol stack can sense and extract bottom layer information (for example, the physical layer channel information). In this way, the sending rate of the transport layer can be subsequently adjusted based on higher layer information (transport layer) and the bottom layer information (physical layer channel information). Because multi-layer information is considered, rate adjustment performance can be improved.

In a possible design, an implementation of physical layer channel information of a transmit link on which the sending device is located by the sending device is that the sending device collects the physical layer channel information of the transmit link via a system interface or a network adapter driver. For example, an ANDROID system is applied and the obtained physical layer channel information is a physical layer rate, the sending device periodically invokes a getLinkSpeed (which may have another name) interface to obtain a physical layer rate of a connected link (for example, a WIFI link). Subsequently, the sending rate of the transport layer may be adjusted based on the obtained physical layer rate information.

In a possible design, the obtaining physical layer channel information of a receive link on which a receiving device is located includes: receiving a first packet from the receiving device, where the physical layer channel information of the receive link is encapsulated in a part corresponding to the transport layer in the first packet, and the transport layer information is further encapsulated in the part corresponding to the transport layer in the first packet.

In a possible design, the obtaining physical layer channel information of a receive link on which a receiving device is located includes: receiving a second packet from the receiving device, where the physical layer channel information of the receive link is encapsulated in a part corresponding to the transport layer in the second packet, and the transport layer information is further encapsulated in the part corresponding to the transport layer in the second packet.

The second packet further includes a receiving device flag bit, the receiving device flag bit is set, and the set receiving device flag bit indicates that the physical layer channel information is from the receiving device.

In a possible design, the method further includes: sending a third packet to a forwarding device, where the third packet includes a request flag bit, and the request flag bit indicates whether the sending device requests the physical layer channel information of the receive link.

In a possible design, the method further includes: sending a third packet to the receiving device, where the third packet includes a request flag bit, and the request flag bit indicates whether the sending device requests the physical layer channel information of the receive link.

According to a second aspect, an embodiment of this application provides a method for adjusting a sending rate in a near-field communication scenario. The method is performed by a forwarding device, a component (for example, a chip) in the forwarding device, or another component that supports a function of the forwarding device. The method includes: obtaining physical layer channel information of a receive link on which a receiving device of data is located and transport layer information of a connection, and sending the physical layer channel information of the receive link and the transport layer information to a sending device of the data.

The connection is a connection between the sending device and the receiving device.

Optionally, the obtaining physical layer channel information of a receive link on which a receiving device is located by the forwarding device may be that the forwarding device obtains the physical layer channel information of the receive link from the receiving device, or the forwarding device obtains locally stored physical layer channel information of the receive link.

The obtaining transport layer information by the forwarding device may be that the forwarding device obtains the transport layer information from the receiving device, or the forwarding device obtains locally stored transport layer information.

In a possible design, the sending the physical layer channel information of the receive link to a sending device includes: sending a first packet to the sending device, where the physical layer channel information of the receive link is encapsulated in a part corresponding to a transport layer in the first packet.

The first packet further includes a forwarding device flag bit, the forwarding device flag bit is set, and the set forwarding device flag bit indicates that the physical layer channel information is from the forwarding device.

In a possible design, the method further includes receiving a third packet from the sending device, where the third packet includes a request flag bit, and the request flag bit indicates whether the sending device requests the physical layer channel information of the receive link.

According to a third aspect, an embodiment of this application provides a method for adjusting a sending rate in a near-field communication scenario. The method is performed by a receiving device, a component (for example, a chip) in the receiving device, or another component that supports a function of the receiving device. The method includes: obtaining physical layer channel information of a receive link on which the receiving device is located, and sending the physical layer channel information of the receive link to a sending device.

In a possible design, the sending the physical layer channel information of the receive link to a sending device includes: sending a second packet to the sending device, where the physical layer channel information of the receive link is encapsulated in a part corresponding to a transport layer in the second packet.

The second packet further includes a receiving device flag bit, the receiving device flag bit is set, and the set receiving device flag bit indicates that the physical layer channel information is from the receiving device.

In a possible design, the method further includes receiving a third packet from the sending device, where the third packet includes a request flag bit, and the request flag bit indicates whether the sending device requests the physical layer channel information of the receive link.

In a possible design, the method further includes that the receiving device of data obtains transport layer information of a connection to the sending device of the data, and sending the transport layer information to the sending device. Optionally, the receiving device sends a packet to the sending device, and the transport layer information is encapsulated in a part corresponding to the transport layer in the packet.

According to a fourth aspect, an embodiment of this application provides a sending apparatus. The apparatus may be the sending device or a component (for example, a chip) in the sending device, or another component that supports a function of the sending device. The apparatus includes: an obtaining module, configured to obtain transport layer information of a connection, physical layer channel information of a transmit link on which a sending device of data is located, and physical layer channel information of a receive link on which a receiving device of the data is located, where the connection is a connection between the sending device and the receiving device; and an adjustment module, configured to adjust a sending rate of a transport layer of the sending device based on the transport layer information, the physical layer channel information of the transmit link, and the physical layer channel information of the receive link.

In a possible design, the obtaining physical layer channel information of a receive link on which a receiving device is located includes: receiving a first packet from the receiving device, where the physical layer channel information of the receive link is encapsulated in a part corresponding to the transport layer in the first packet, and the transport layer information is further encapsulated in the part corresponding to the transport layer in the first packet.

In a possible design, the obtaining physical layer channel information of a receive link on which a receiving device is located includes: receiving a second packet from the receiving device, where the physical layer channel information of the receive link is encapsulated in a part corresponding to the transport layer in the second packet, and the transport layer information is further encapsulated in the part corresponding to the transport layer in the second packet.

The second packet further includes a receiving device flag bit, the receiving device flag bit is set, and the set receiving device flag bit indicates that the physical layer channel information is from the receiving device.

In a possible design, the apparatus further includes a sending module, configured to send a third packet to the receiving device, where the third packet includes a request flag bit, and the request flag bit indicates whether the sending device requests the physical layer channel information of the receive link.

According to a fifth aspect, an embodiment of this application provides a forwarding apparatus. The forwarding apparatus may be the forwarding device or a component (for example, a chip) in the forwarding device, or another component that supports a function of the forwarding device. The forwarding apparatus includes: an obtaining module, configured to obtain physical layer channel information of a receive link on which a receiving device of data is located and obtain transport layer information of a connection, where the connection is a connection between a sending device of the data and the receiving device; and a sending module, configured to send the physical layer channel information of the receive link and the transport layer information to the sending device.

In a possible design, the sending module is further configured to send a first packet to the sending device, where the physical layer channel information of the receive link is encapsulated in a part corresponding to a transport layer in the first packet.

The first packet further includes a forwarding device flag bit, the forwarding device flag bit is set, and the set forwarding device flag bit indicates that the physical layer channel information is from the forwarding device.

In a possible design, the forwarding device further includes: a receiving module, configured to receive a third packet from the sending device, where the third packet includes a request flag bit, and the request flag bit indicates whether the sending device requests the physical layer channel information of the receive link.

According to a sixth aspect, an embodiment of this application provides a receiving apparatus. The receiving apparatus may be the receiving device or a component (for example, a chip) in the receiving device, or another component that supports a function of the receiving device. The receiving apparatus includes an obtaining module, configured to obtain physical layer channel information of a receive link on which a receiving device is located; and a sending module, configured to send the physical layer channel information of the receive link to a sending device.

In a possible design, the sending module is further configured to send a second packet to the sending device, where the physical layer channel information of the receive link is encapsulated in a part corresponding to a transport layer in the second packet.

The second packet further includes a receiving device flag bit, the receiving device flag bit is set, and the set receiving device flag bit indicates that the physical layer channel information is from the receiving device.

In a possible design, the receiving device further includes a receiving module, configured to receive a third packet from the sending device, where the third packet includes a request flag bit, and the request flag bit indicates whether the sending device requests the physical layer channel information of the receive link.

In a possible design, the obtaining module is further configured to obtain transport layer information of a connection, where the connection is a connection between the sending device and the receiving device.

The sending module is further configured to send the transport layer information to the sending device. Optionally, the transport layer information is sent to the sending device via a forwarding device.

According to a seventh aspect, this application provides a wireless communication system, including: a forwarding device, configured to send, to a sending device of data, physical layer channel information of a receive link on which a receiving device of the data is located, and send, to the sending device, transport layer information of a connection, where the connection is a connection between the sending device and the receiving device; and the sending device, configured to: obtain physical layer channel information of a transmit link on which the sending device is located, receive the transport layer information and the physical layer channel information of the receive link from the forwarding device, and adjust a sending rate of a transport layer of the sending device based on the transport layer information, the physical layer channel information of the transmit link, and the physical layer channel information of the receive link.

In a possible design, that a forwarding device is configured to send, to a sending device of data, physical layer channel information of a receive link on which a receiving device of the data is located includes: configured to send a first packet to the sending device, where the physical layer channel information of the receive link is encapsulated in a part corresponding to the transport layer in the first packet.

The first packet further includes a forwarding device flag bit, the forwarding device flag bit is set, the set forwarding device flag bit indicates that the physical layer channel information is from a forwarding device, and the transport layer information is further encapsulated in the part corresponding to the transport layer in the first packet.

In a possible design, the forwarding device is further configured to receive a third packet from the sending device, where the third packet includes a request flag bit, and the request flag bit indicates whether the sending device requests the physical layer channel information of the receive link.

According to an eighth aspect, this application provides a communication system, including: a receiving device, configured to send, to a sending device of data, physical layer channel information of a receive link on which the receiving device of the data is located; a forwarding device, configured to send transport layer information of a connection to the sending device, where the connection is a connection between the sending device and the receiving device; and the sending device, configured to: obtain physical layer channel information of a transmit link on which the sending device is located, receive the transport layer information and the physical layer channel information of the receive link from the receiving device, and adjust a sending rate of a transport layer of the sending device based on the transport layer information, the physical layer channel information of the transmit link, and the physical layer channel information of the receive link.

That a forwarding device is configured to send transport layer information of a connection to the sending device includes receiving the transport layer information from the receiving device, and sending the transport layer information to the sending device, where the connection is the connection between the sending device and the receiving device.

Alternatively, the forwarding device obtains locally stored transport layer information, and sends the transport layer information to the sending device.

In a possible design, that a receiving device is configured to send, to a sending device of data, physical layer channel information of a receive link on which the receiving device of the data is located includes sending a second packet to the sending device, where the physical layer channel information of the receive link is encapsulated in a part corresponding to the transport layer in the second packet, and the transport layer information is further encapsulated in the part corresponding to the transport layer in the second packet.

The second packet further includes a receiving device flag bit, the receiving device flag bit is set, and the set receiving device flag bit indicates that the physical layer channel information is from the receiving device.

In a possible design, the receiving device is further configured to receive a third packet from the sending device, where the third packet includes a request flag bit, and the request flag bit indicates whether the sending device requests the physical layer channel information of the receive link.

In a possible design of any one of the foregoing aspects, the physical layer channel information of the transmit link includes one or a combination of a plurality of items of the following: physical layer rate information of the transmit link, a received signal strength indicator (RSSI) of the transmit link, a signal-to-noise ratio (SNR) of the transmit link, an actual service rate of the transmit link, a quantity of access devices of the transmit link, traffic of an access device of the transmit link, a protocol type of the access device of the transmit link, a type of the access device of the transmit link, frame aggregation information of the transmit link, a bandwidth of the transmit link, a channel quality indicator (CQI) of the transmit link, and a resource of the transmit link.

The physical layer channel information of the receive link includes one or a combination of a plurality of items of the following: physical layer rate information of the receive link, an RSSI of the receive link, an SNR of the receive link, an actual service rate of the receive link, a quantity of access devices of the receive link, traffic of an access device of the receive link, a protocol type of the access device of the receive link, a type of the access device of the receive link, frame aggregation information of the receive link, a bandwidth of the receive link, a CQI of the receive link, and a resource of the receive link.

The bandwidth of the transmit link refers to a bandwidth resource of the transmit link, and further, refers to a maximum bandwidth of a path in an average sending direction. The bandwidth of the receive link refers to a bandwidth resource of the receive link, that is, a maximum bandwidth of a path in an average receiving direction.

The actual service rate may refer to a sending rate of an application.

The frame aggregation information may be, for example, but is not limited to, a quantity of media access control (MAC) frames aggregated into an aggregate media access control protocol data unit (AMPDU) at a physical layer.

For example, the protocol type of the access device may be a WIFI protocol type, for example, may be the 802.11 a/b/g/n/ac protocol. The type of the access device may refer to a chip brand, a chip model, or the like of the access device.

In a possible design of any one of the foregoing aspects, the transport layer information includes a packet loss rate and/or an RTT.

In a possible design of any one of the foregoing aspects, the sending rate of the transport layer is less than or equal to an upper rate limit, and the upper rate limit is related to the physical layer channel information of the transmit link and the physical layer channel information of the receive link.

In a possible design of any one of the foregoing aspects, the sending rate of the transport layer meets the following relationship: Sendrate=$V_{max} * f_{trans}$+Ra, where Sendrate is the sending rate of the transport layer, $V_{max}$ is the upper rate limit, $f_{trans}$ is related to the transport layer information, and Ra is a first deviation factor.

In a possible design of any one of the foregoing aspects, where if there is interference between the transmit link and the receive link, the upper rate limit is $V_{max}=V_1*V_2/(V_1+V_2)$; or if there is no interference between the transmit link and the receive link, the upper rate limit is $V_{max}=V_2$).

$V_1=C_1*R_1*I_1 \pm D_1$, $V_2=C_2*R_2*I_2 \pm D_2$, $V_1$ represents a maximum rate of the transmit link, $R_1$ represents a physical layer rate of the transmit link, $C_1$ represents a valid data proportion of the transmit link, $I_1$ represents an interference factor of the transmit link, $D_1$ represents a second deviation factor, and $I_1$ is related to the quantity of access devices of the transmit link and the traffic of the access device of the transmit link.

$V_2$ represents a maximum rate of the receive link, $R_2$ represents a physical layer rate of the receive link, $C_2$ represents a valid data proportion of the receive link, $I_2$ represents an interference factor of the receive link, $D_2$ represents a third deviation factor, and $I_2$ is related to the quantity of access devices of the receive link and the traffic of the access device of the receive link.

The interference factor and the deviation factor may be considered as an error caused by a mean system.

It should be noted that, the interference between the transmit link and the receive link means mutual interference that is generated because the transmit link (for example, a link between a sending mobile phone and an AP) and the receive link (for example, a link between an AP and a receiving mobile phone) contend for a channel.

In a possible design of any one of the foregoing aspects, the first packet further includes a forwarding device flag bit, the forwarding device flag bit is set, and the set forwarding device flag bit indicates that the physical layer channel information is from the forwarding device.

In a possible design of any one of the foregoing aspects, the request flag bit is set, to indicate that the sending device requests the physical layer channel information of the receive link. If the request flag bit is 0, it indicates that the sending device does not request the physical layer channel information of the receive link.

Alternatively, in a possible design of any one of the foregoing aspects, the third packet does not include the request flag bit, in other words, the request flag bit is default. In this case, it also indicates that the sending device does not request the physical layer channel information of the receive link.

According to a ninth aspect, this application provides a communication apparatus, configured to implement a function of the sending apparatus in any one of the foregoing aspects, or configured to implement a function of the forwarding apparatus in any one of the foregoing aspects, or configured to implement a function of the receiving apparatus in any one of the foregoing aspects.

According to a tenth aspect, this application provides a communication apparatus. The apparatus has a function of implementing the method for adjusting a sending rate in any one of the foregoing aspects. The function may be implemented by hardware, or may be implemented by hardware executing corresponding software. The hardware or the software includes one or more modules corresponding to the function.

According to an eleventh aspect, a communication apparatus is provided. The apparatus includes a processor and a memory. The memory is configured to store computer-executable instructions. When the communication apparatus runs, the processor executes the computer-executable instructions stored in the memory, so that the communication apparatus performs the method for adjusting a sending rate in any design of the foregoing aspects.

According to a twelfth aspect, a communication apparatus is provided. The apparatus includes a processor. The processor is configured to: after coupling to a memory and reading instructions in the memory, perform, based on the instructions, the method for adjusting a sending rate in any design of the foregoing aspects.

According to a thirteenth aspect, an embodiment of this application provides a communication apparatus. The apparatus may be a chip system. The chip system includes a processor, and may further include a memory, configured to implement a function of the method in any one of the foregoing aspects. The chip system may include a chip, or may include a chip and another discrete component.

According to a fourteenth aspect, a communication apparatus is provided. The apparatus may be a circuit system, the circuit system includes a processing circuit, and the processing circuit is configured to perform the method for adjusting a sending rate in any one of the foregoing aspects.

According to a fifteenth aspect, an embodiment of this application further provides a computer-readable storage medium, including instructions, and when the instructions are run on a computer, the computer is enabled to perform the method in any one of the foregoing aspects.

According to a sixteenth aspect, an embodiment of this application further provides a computer program product, including instructions. When the computer program product runs on a computer, the computer is enabled to perform the method in any one of the foregoing aspects.

According to a seventeenth aspect, an embodiment of this application provides a system. The system includes the sending apparatus according to any implementation of the fourth aspect and the forwarding apparatus according to any implementation of the fifth aspect, the sending apparatus according to any implementation of the fourth aspect and the receiving apparatus according to any implementation of the sixth aspect, or includes the sending apparatus according to any implementation of the fourth aspect, the forwarding apparatus according to any implementation of the fifth aspect, and the receiving apparatus according to any implementation of the sixth aspect.

DESCRIPTION OF EMBODIMENTS

In the specification and accompanying drawings of this application, the terms "first", "second", and the like are intended to distinguish between different objects or distinguish between different processing of a same object, but do not indicate a particular order of the objects.

"At least one" means one or more.

"A plurality of" refers to two or more than two.

A term "and/or" describes an association relationship between associated objects and indicates that three relationships may exist. For example, A and/or B may indicate the following cases: Only A exists, both A and B exist, and only B exists, where A and B may be singular or plural.

The character "/" generally indicates an "or" relationship between associated objects. For example, A/B may represent A or B.

In addition, the terms "including", "having", or any other variant thereof in descriptions of this application are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device.

It should be noted that, in embodiments of this application, the word "exemplary" or "for example" is used to represent giving an example, an illustration, or a description. Any embodiment or design solution described as an "example" or "for example" in embodiments of this application should not be explained as being more preferred or having more advantages than another embodiment or design scheme. Exactly, use of the word "example" or "for example" or the like is intended to present a related concept in a specific manner.

In the specification and the accompanying drawings of this application, "of (English: of)", "relevant (English: corresponding, relevant)", and "corresponding (English: corresponding)" may sometimes be interchangeably used. It should be noted that consistent meanings are expressed when differences are not emphasized.

Figure 1A:
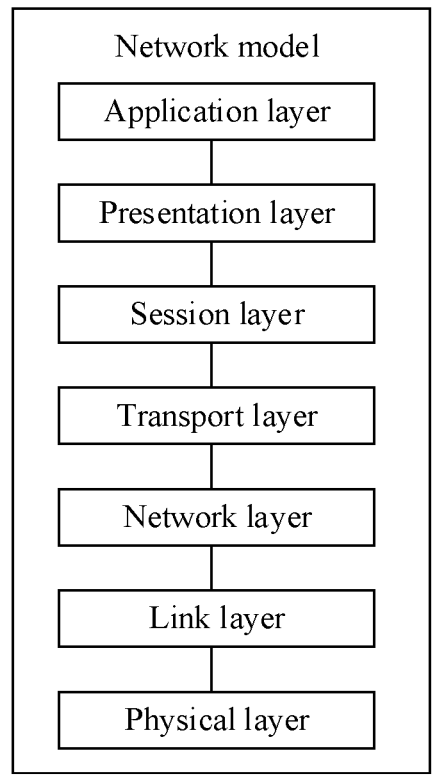
FIG. 1A and FIG. 1B are schematic diagrams of an end-to-end rate adjustment method according to an embodiment of this application.

A current computer network model defines a hierarchical architecture of network interconnection. An OSI model shown in FIG. 1A is used as an example. The model defines a seven-layer architecture of network interconnection. The seven-layer architecture includes an application layer, a presentation layer, a session layer, a transport layer, a network layer, a link layer, and a physical layer from top to bottom. A sending rate of the transport layer may be adjusted, to improve a data transmission capability, and further improve communication efficiency. Currently, to adjust the sending rate of the transport layer, there are the following congestion control solutions:

(1) End-to-End (End-to-End) Congestion Control Algorithm at a Transport Layer

Algorithm essence: is negative feedback control based on feedback information at a network side.

Figure 1B:
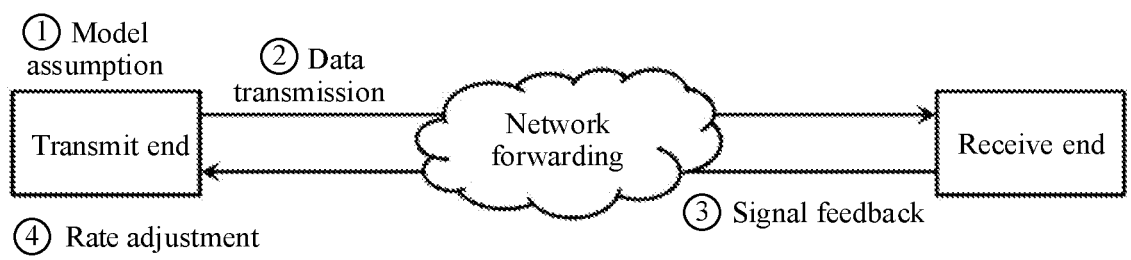

Algorithm principle: Referring to FIG. 1B, first, the algorithm makes a model assumption of a network, and the model assumption generally ensures that the algorithm can converge to a balance point in a mathematical sense. Then, a sender transmits data to a receiver, and the algorithm continuously adjusts a rate for an observed signal feedback. In an example, when the sender does not receive the signal feedback from the receiver, the algorithm increases a transmit window (or referred to as a congestion window) in a manner specified by an assumed model of the algorithm, to adjust the sending rate. When the sender receives the signal feedback from the receiver, the algorithm reduces the sending rate in a manner specified by the model. The congestion control algorithm of the sender continuously iterates the foregoing procedure, to detect an available capacity of a communication link.

Figure 2:
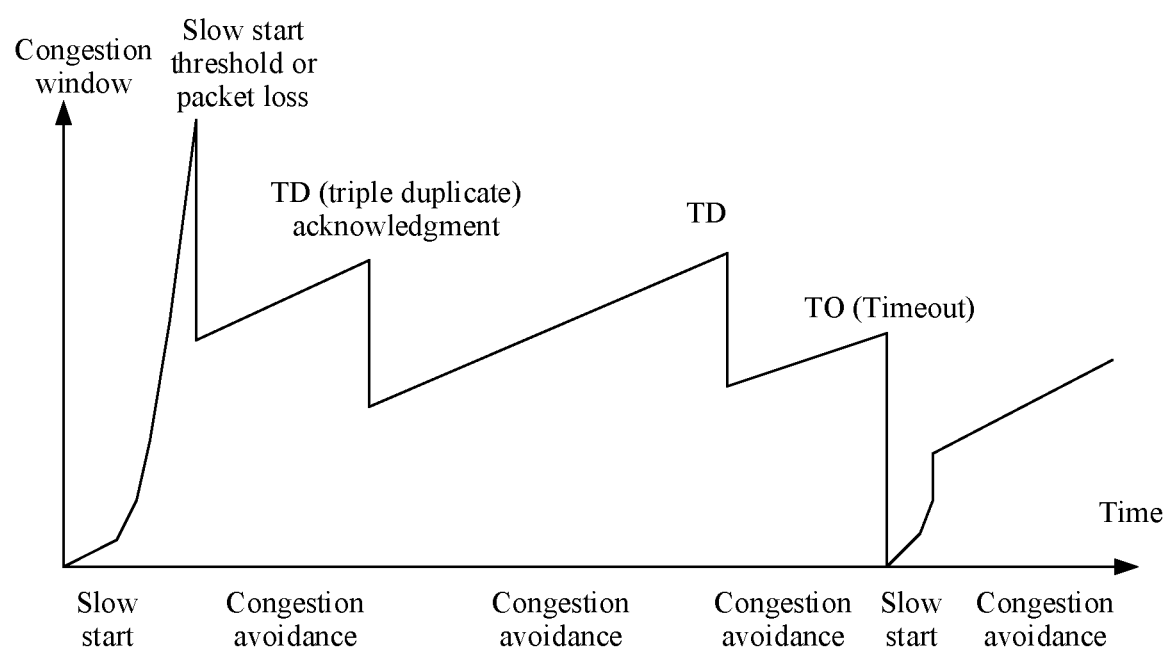
FIG. 2 is a schematic diagram of an end-to-end rate adjustment method according to an embodiment of this application.

Reno based on the Transmission Control Protocol (TCP) is a typical end-to-end congestion control solution. Referring to FIG. 2, according to a model assumption made by Reno for the network, the Reno algorithm is divided into four phases: slow start, congestion avoidance, fast retransmission, and fast recovery.

Slow start phase: No large amount of data is sent at the beginning of this phase. Instead, a network congestion degree needs to be detected first. In an example, when no packet loss occurs, a sender increases a congestion window (CWND) by one unit each time the sender receives an acknowledgment (ACK) message. The CWND can be doubled every RTT, and the CWND increases exponentially. If packet loss occurs, the sender reduces a congestion window size by half and enters the congestion avoidance phase. Alternatively, when a congestion window size reaches a slow start threshold, the sender enters the congestion avoidance phase.

The unit of the congestion window size is a maximum segment size (max segment size, MSS).

Congestion avoidance phase: In this phase, the congestion window size increases by one unit per RTT, and the congestion window size increases linearly. When the sender receives triple duplicate (TD) ACKs of a packet, it is considered that a next packet of the packet is lost and the sender enters the fast retransmission phase.

Fast retransmission phase: In this phase, the sender immediately retransmits the lost packet instead of waiting for timeout retransmission. After this phase is complete, the sender enters the fast recovery phase.

Fast recovery phase: In this phase, the sender changes the slow start threshold to half of the current congestion window size, and the congestion window size is equal to the slow start threshold. Then, the sender enters the congestion avoidance phase and repeats the preceding process.

Optionally, when the ACK acknowledgment times out (timeout (TO)), the sender may enter the slow start phase.

In a near-field sending rate adjustment solution based on end-to-end congestion control, the sender increases or decreases a transmit window based on an assumed model, to adjust a sending rate. However, in a near-field wireless environment, a communication channel is time-varying, and jitter of an indicator such as a packet loss rate is large. Consequently, statistics of the packet loss rate may be inaccurate. In this way, the sending rate is calculated based on an inaccurate indicator such as the packet loss rate, and consequently the calculated sending rate is not accurate enough. It can be learned that in a near-field wireless communication scenario, in the sending rate adjustment solution of end-to-end congestion control, sending rate adjustment performance is poor.

(2) Network-Assisted Congestion Control at a Network Layer

In network-assisted congestion control, a network forwarding device (for example, a wireless access point) provides congestion indication information for a sender, to indicate a specific congestion status of the network. The network forwarding device usually sends the congestion indication information to the sender in an out-band manner or an in-band manner. In the out-band manner, the network forwarding device directly sends the congestion indication information to the sender in a form of a congestion packet. In the in-band manner, the network forwarding device marks or updates a field in a packet sent from the sender to a receiver. Once the receiver receives a marked packet, the receiver sends the congestion indication information to the sender.

Explicit congestion notification (ECN) is a typical network-assisted congestion control solution that uses the in-band manner. A router encapsulates and sets a congestion experienced (CE) bit in a data packet sent to a receiver. After receiving the data packet whose CE bit is set, the receiver sends the data packet to a sender, where the data packet carries the set CE bit. After receiving the data packet whose CE bit is set, the sender learns that network congestion occurs, and reduces a sending rate.

In the sending rate adjustment solution of network-assisted congestion control, the network forwarding device is required to support a network-assisted related function. Implementation complexity of the network forwarding device is high, and deployment costs are high.

It can be learned that the current method for adjusting a sending rate has poor performance.

To resolve the foregoing technical problem, an embodiment of this application provides a method for adjusting a sending rate. The method may be applied to a data transmission process in a near-field wireless network environment, and is used for adjusting a sending rate of a transport layer. In an example, in a process in which a sending device transmits data to a receiving device, the transmitted data includes but is not limited to a file, a video, and the like. The file is, for example, but is not limited to, phone clone data. The near-field wireless network environment refers to an environment in which a sender and a receiver are directly connected via a wireless network. For example, the receiver and the sender communicate through wireless fidelity direct (wireless fidelity direct, Wi-Fi-direct) communication, or the sender and the receiver are connected via only a one-hop wireless forwarding device. The wireless forwarding device may be a non-3GPP device, for example, a WIFI device. Alternatively, the wireless forwarding device may be a 3GPP device, for example, a 4G mobile communication technology base station or a 5G mobile communication technology base station. The sender of data sends the data to the receiver of the data via a near-field wireless network.

Figure 3A:
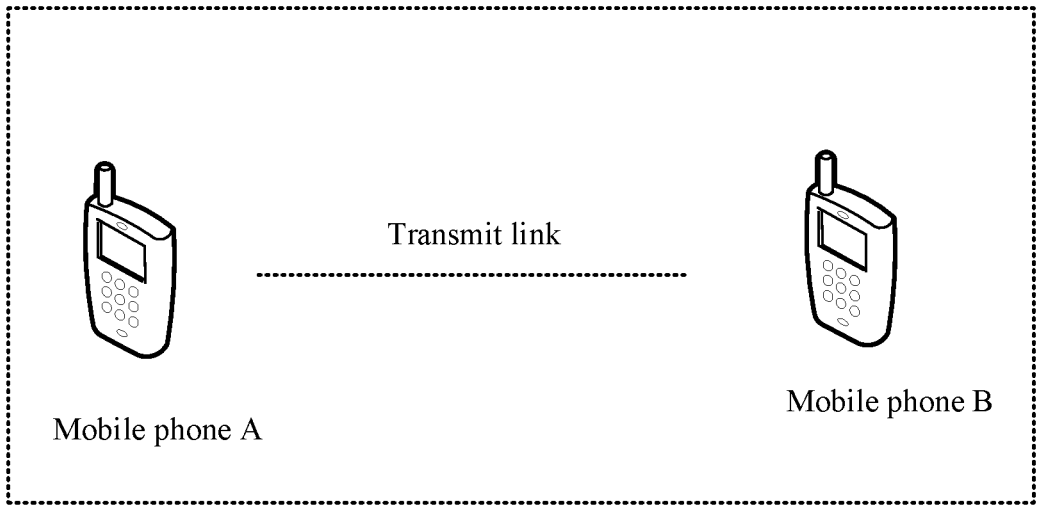
FIG. 3 is a schematic diagram of a system structure according to an embodiment of this application.

FIG. 3A shows a system architecture of a near-field network to which a technical solution according to an embodiment of this application is applicable. The near-field network system includes a sending device (a mobile phone A) and a receiving device (a mobile phone B). The sending device and the receiving device may be directly connected and directly communicate with each other.

Figure 3B:
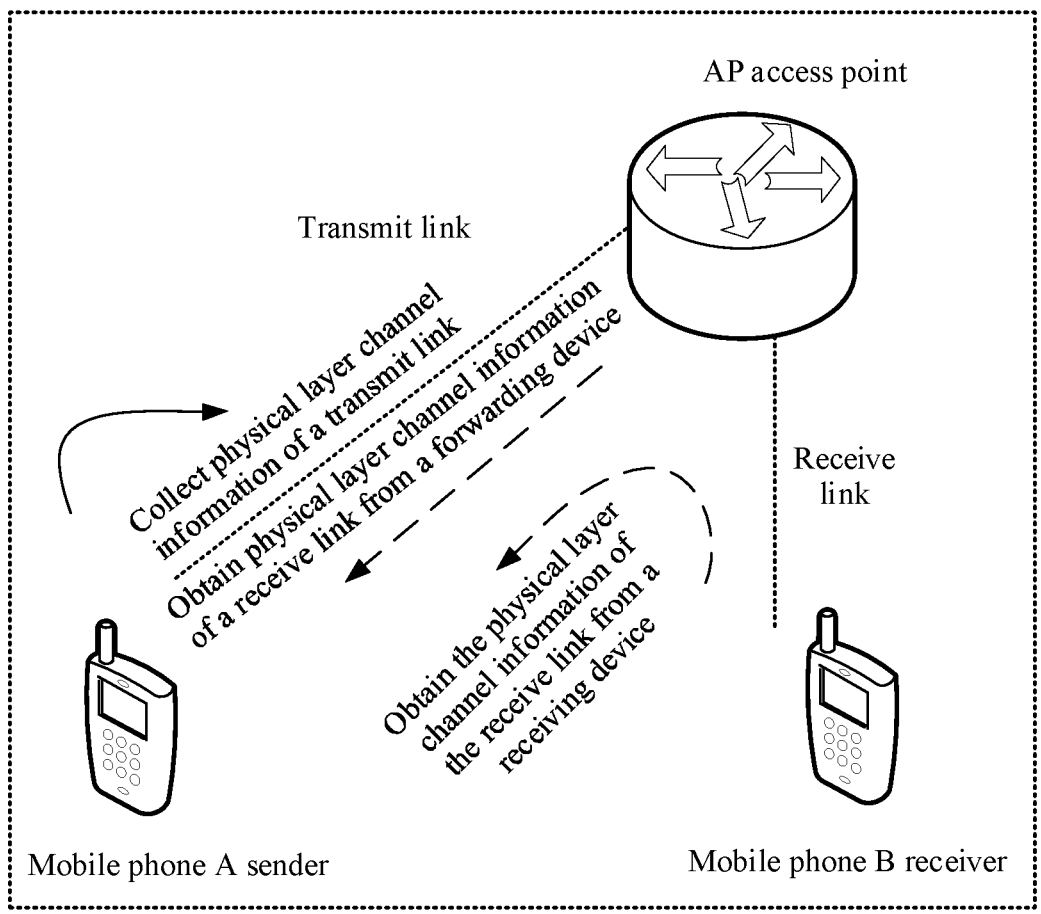

FIG. 3B shows a system architecture of another near-field network to which a technical solution according to an embodiment of this application is applicable. The near-field network system includes a sending device (a mobile phone A), a receiving device (a mobile phone B), and a forwarding device (an access point). In a scenario shown in FIG. 3B, the sending device may directly exchange data with the receiving device. For example, the sending device may be connected to the receiving device by using a data hotspot, and send the data to the receiving device. The sending device may alternatively send the data to the receiving device via the forwarding device.

The sending device and the receiving device may each be a communication device having wireless communication function, or a chip or a chip system that may be disposed in the device, or another component having a wireless communication function, including a desktop device, a laptop device, a handheld device, a vehicle-mounted user equipment (UE) device, and the like, for example, a smartphone, a cellular phone, a smartwatch, a desktop computer, a tablet computer, a smart TV box, an ultra-mobile personal computer (UMPC), a netbook, a personal digital assistant (PDA), a portable multimedia player (PMP), a dedicated media player, a consumer communication device, a wearable device, an augmented reality (AR)/virtual reality (VR) device, and other types of communication devices.

The forwarding device is a device having a wireless transceiver function, or a chip or a chip system that may be disposed in the device, or another component having a wireless transceiver function. The forwarding device includes but is not limited to: an access point (access point, AP) in a WIFI system, such as a home gateway, a router, a server, a switch, and a bridge, an evolved NodeB (eNB), a radio network controller (RNC), a NodeB (NB), a base station controller (BSC), a base transceiver station (BTS), a home base station (for example, a home evolved NodeB, or a home NodeB (HNB)), a baseband unit (BBU), a wireless relay node, a wireless backhaul node, a transmission point ((TP) or a transmission and reception point (TRP)), or the like. The network device may alternatively be a gNB or a transmission point (TRP or TP) in a 5G system, for example, a new radio (NR) system, or one antenna panel or a group of antenna panels (including a plurality of antenna panels) of a base station in a 5G system. The network device may alternatively be a network node, such as a baseband unit (BBU), a distributed unit (DU), or a road side unit (RSU) having a base station function, that constitutes a gNB or a transmission point.

A system architecture and a service scenario described in this application are intended to describe the technical solutions of this application more clearly, and do not constitute a unique limitation to the technical solutions provided in this application. A person of ordinary skill in the art may know that, with evolution of a system architecture and emergence of a new service scenario, the technical solutions provided in this application are also applicable to similar technical problems.

Figures 4, 5:
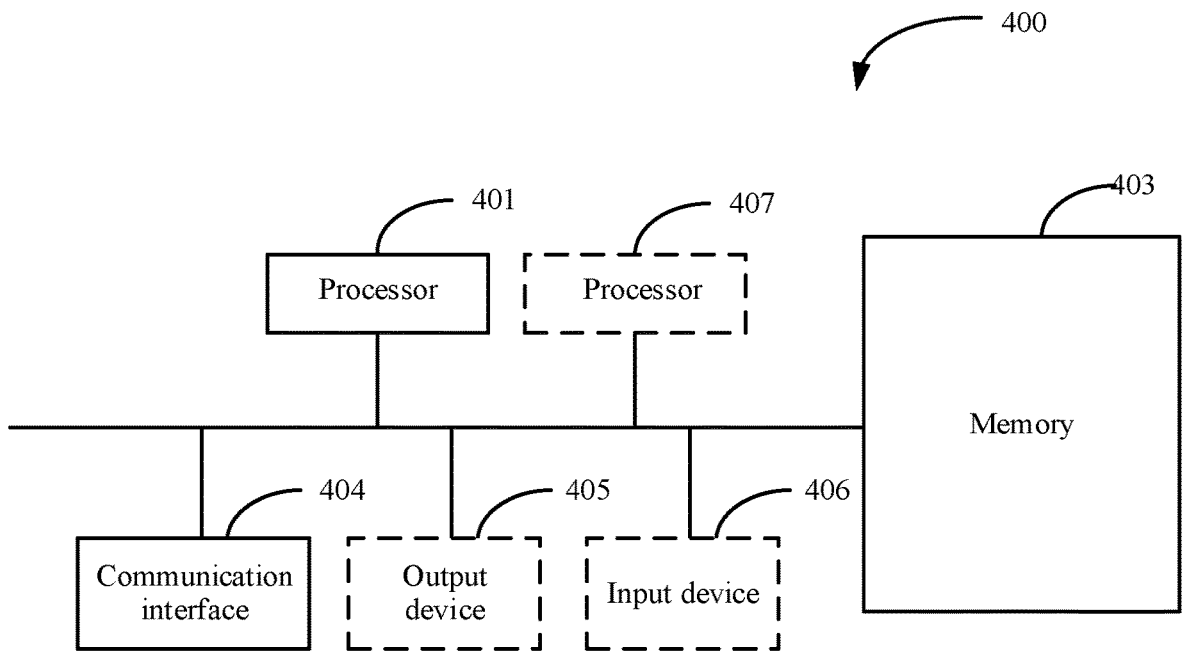
FIG. 4 is a schematic diagram of a structure of a device according to an embodiment of this application.
FIG. 5 to FIG. 6 are schematic flowcharts of a method for adjusting a sending rate according to an embodiment of this application.

Optionally, the sending device, the receiving device, and the forwarding device in embodiments of this application may be implemented by a communication device having a structure described in FIG. 4. FIG. 4 is a schematic diagram of a hardware structure of a communication device according to an embodiment of this application. The communication device 400 includes at least one processor 401, a memory 403, and at least one communication interface 404. The memory 403 may alternatively be included in the processor 401.

The processor 401 may include one or more processing units. The processing unit may be a central processing unit (CPU), an application-specific integrated circuit (ASIC), or one or more integrated circuits configured to control program execution of the solutions of this application.

A communication line exists between the foregoing components, and is configured to transmit information between the components.

The communication interface 404 is configured to communicate with another device. In this embodiment of this application, the communication interface may be a module, a circuit, an interface, or another apparatus that can implement a communication function, and is configured to communicate with another device. Optionally, the communication interface may be a transmitter that is independently disposed, and the transmitter may be configured to send information to another device; or the communication interface may be a receiver that is independently disposed, and is configured to receive information from another device.

Alternatively, the communication interface may be a component integrating functions of sending and receiving information. A specific implementation of the communication interface is not limited in this embodiment of this application.

The memory 403 may be a read-only memory (ROM) or another type of storage module that can store static information and instructions, a random-access memory (RAM) or another type of storage module that can dynamically store information and instructions, or may be an electrically erasable programmable read-only memory (EEPROM), an optical disc, a magnetic disk, or another magnetic storage device. The memory may exist independently, and is connected to the processor through the communication line. The memory may alternatively be integrated with the processor.

The memory 403 is configured to store computer-executable instructions. The computer-executable instructions may be invoked by one or more processing units in the processor 401 to perform corresponding steps in the methods provided in the following embodiments.

Optionally, the computer-executable instructions in embodiments of this application may also be referred to as application program code, instructions, a computer program, or another name. This is not limited in embodiments of this application.

During an implementation, in an embodiment, the communication device 400 may include a plurality of processors, for example, the processor 401 and a processor 407 in FIG. 4. Each of the processors may be a single-core processor, or may be a multi-core processor. The processor herein may be one or more devices, circuits, and/or processing cores configured to process data (for example, computer program instructions).

In an implementation, in an embodiment, the communication device 400 may further include an output device 405 and an input device 406. The output device 405 communicates with the processor 401, and may display information in a plurality of manners. For example, the output device 405 may be a liquid-crystal display (LCD), a light-emitting diode (LED) display device, a cathode ray tube (CRT) display device, or a projector (projector). The input device 406 communicates with the processor 401, and may receive an input of a user in a plurality of manners. For example, the input device 406 may be a mouse, a keyboard, a touchscreen device, a sensor device, or the like.

FIG. 4 is an example diagram of a structure of the communication device. It should be understood that the communication device shown in the figure is merely an example, and during actual application, the communication device may have more or fewer components than those shown in FIG. 4, or two or more components may be combined, or the communication device may have different component configurations.

The communication device 400 may be a general-purpose device or a dedicated device. A type of the communication device 400 is not limited in embodiments of this application. The sending device, the receiving device, or the forwarding device may be a device with a structure similar to that in FIG. 4.

The following describes a method for adjusting a sending rate provided in an embodiment of this application with reference to accompanying drawings.

In the following embodiments, a sending rate adjustment process is described by using an example in which the system shown in FIG. 3A or FIG. 3B is applied, in other words, the mobile phone A is used as a sending device, and the mobile phone B is used as a receiving device. When the mobile phone A is used as the receiving device, and the mobile phone B is used as the sending device, for a process of adjusting a sending rate of the mobile B, refer to a process in which the mobile A is used as the sending device.

Referring to FIG. 5, a method for adjusting a sending rate according to an embodiment of this application includes the following steps.

S601: A sending device obtains physical layer channel information of a transmit link on which the sending device is located, physical layer channel information of a receive link on which a receiving device is located, and transport layer information between a connection.

The connection is a connection between the sending device and the receiving device.

In this embodiment of this application, referring to FIG. 3B, the transmit link on which the sending device is located refers to a link directly connected to the sending device (the mobile phone A). The receive link on which the receiving device is located refers to a link directly connected to the receiving device (the mobile phone B).

It may be understood that different physical channels may correspond to different physical layer channel information. A near-field network in this embodiment of this application may be a non-3GPP standard network, for example, a Wi-Fi network. In this case, the sending device, the receiving device, and a forwarding device (if any) need to support a non-3GPP standard. The physical layer channel information includes but is not limited to one or a combination of the following items: physical layer rate information of the link, an RSSI of the link, a SNR of the link, an actual service rate of the link, a quantity of access devices of the link, traffic of each access device, frame aggregation information of the link, and link bandwidth.

Alternatively, the near-field network may be a 3GPP standard network, for example, a 4G/5G wireless network. Correspondingly, the sending device, the receiving device, and the forwarding device (if any) need to support a 3GPP standard. The physical layer channel information includes but is not limited to one or a combination of the following items: a physical layer rate of a link, frame aggregation information of the link, CQI of the link, link bandwidth, a quantity of access devices of the link, traffic of each access device, a protocol type of each access device, and a type of each access device. The physical layer channel information represents a real status of a physical channel.

The transport layer information includes but is not limited to any one or more of the following information: a packet loss rate), an RTT, and a throughput. The transport layer information can reflect a network status change, such as cross traffic, namely, traffic of other users.

In this embodiment of this application, a concept of physical layer channel information sharing is proposed. The sending device, the receiving device, and the forwarding device may share physical layer channel information. In an example, each device collects physical layer channel information of a connected link, and may send the collected physical layer channel information to another device.

It may be understood that, to implement physical layer channel information sharing, protocol stacks of the sending device, the receiving device, and the forwarding device need to support a function of reading and writing the physical layer channel information.

Figure 6:
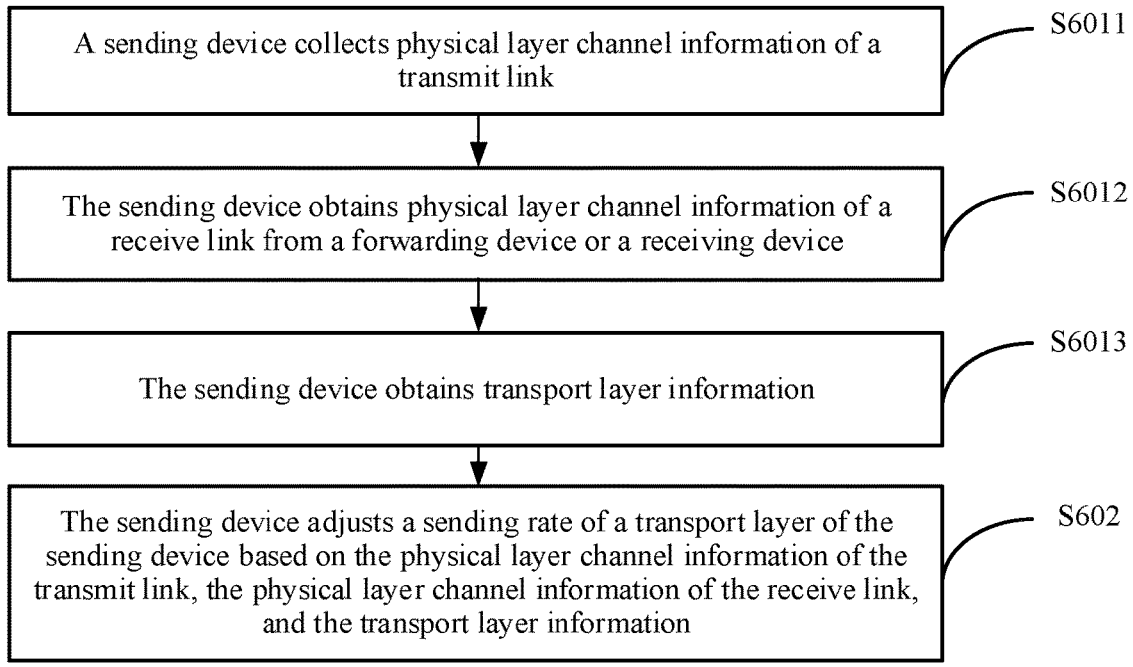

Based on the foregoing physical layer channel information sharing mechanism, refer to FIG. 6. For a sending device, S601 may include the following steps. S6011: The sending device collects physical layer channel information of a transmit link. S6012: The sending device obtains physical layer channel information of a receive link from a forwarding device or a receiving device. S6013: The sending device obtains transport layer information. That the sending device obtains physical layer channel information of a receive link from a forwarding device may be that the sending device obtains the physical layer channel information of the receive link collected by the forwarding device. The sending device obtains physical layer channel information of a receive link from a receiving device may be obtaining the physical layer channel information of the receive link collected by the receiving device.

An execution sequence of S6011 and S6012 is not limited in this embodiment of this application.

In a possible implementation, that the device collects physical layer channel information of a directly connected link may be that the device collects the physical layer channel information of the connected link via a system interface or a network adapter driver. In other words, S6011 may be implemented as follows. The sending device collects the physical layer channel information of the transmit link via the system interface or the network adapter driver. For example, an ANDROID system is applied and the obtained physical layer channel information is a physical layer rate, the sending device periodically invokes a getLinkSpeed (which may have another name) interface to obtain a physical layer rate of a connected link (for example, a WIFI link).

In this embodiment of this application, the physical layer channel information obtained by the device may be used for adjusting a sending rate of the device. Optionally, the physical layer channel information may alternatively be encapsulated in a packet, and is provided for a peer device, to adjust a sending rate of the peer device.

Optionally, the device collects physical layer channel information in real time. Alternatively, optionally, the device periodically collects physical layer channel information. A collection periodicity may be flexibly set.

Figure 7A:
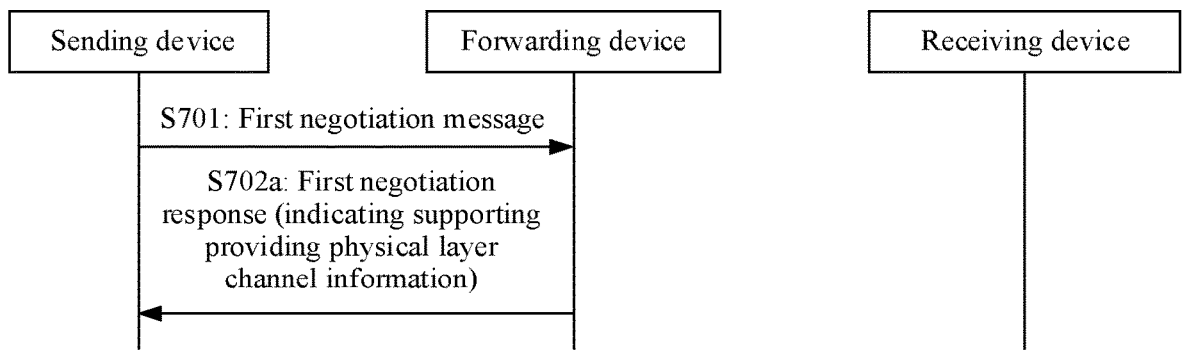
FIG. 7A, FIG. 7B and FIG. 7C are schematic flowcharts of physical layer channel information negotiation according to an embodiment of this application.
Figure 7B:
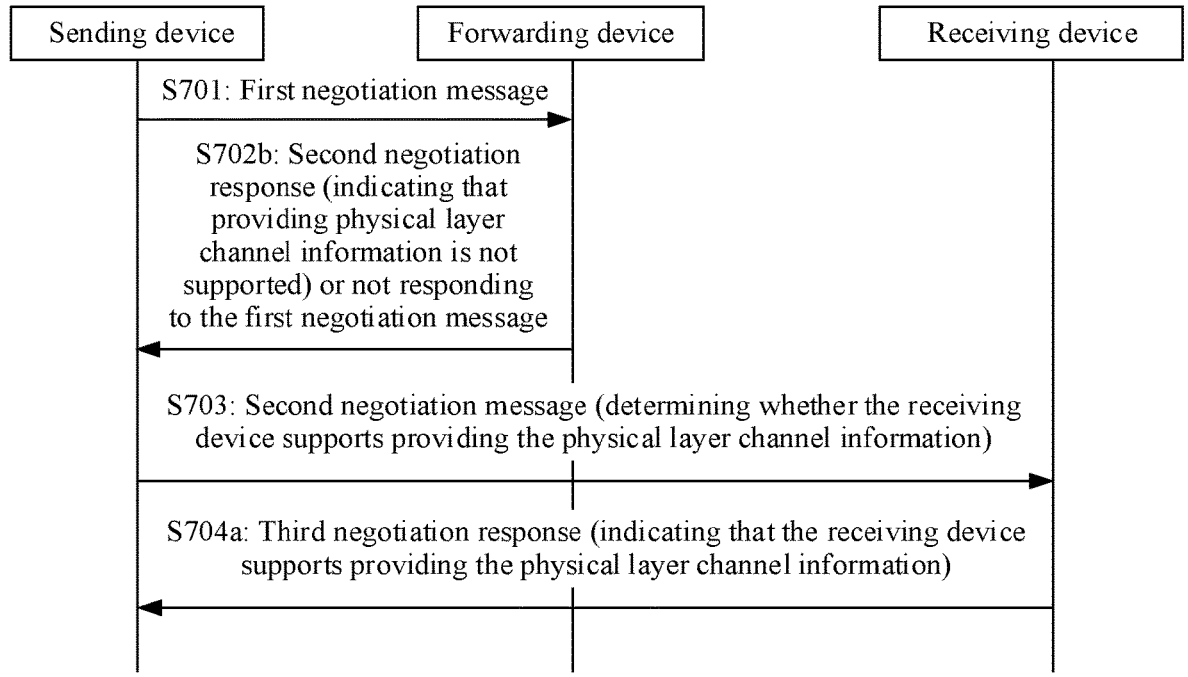
Figure 7C:
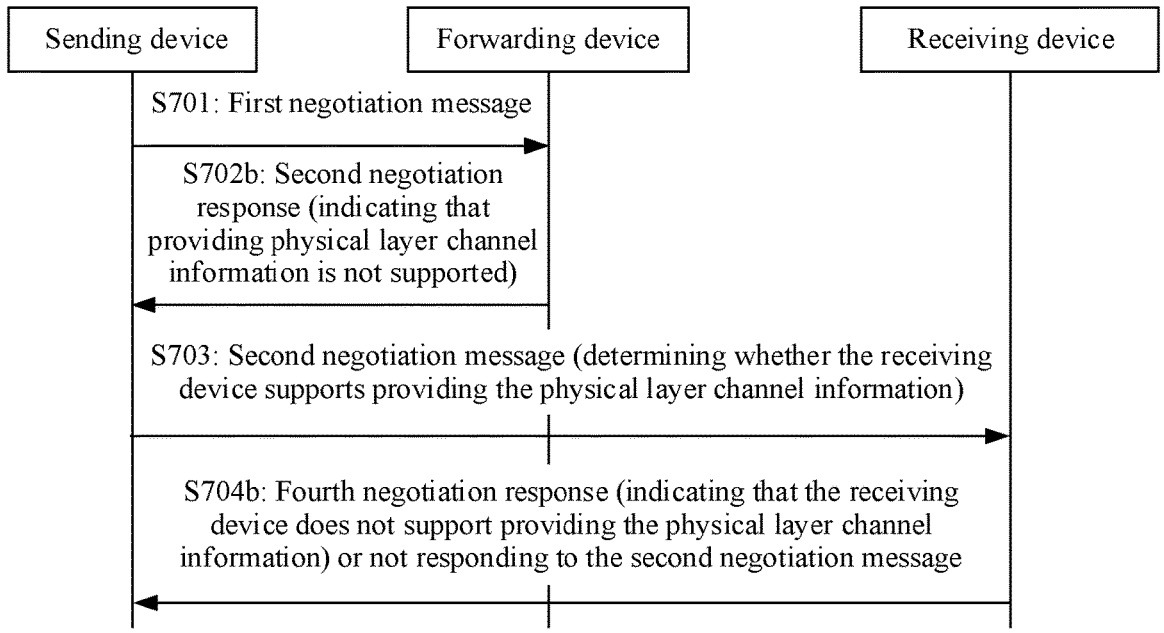

In this embodiment of this application, to implement physical layer channel information sharing, optionally, an information sharing negotiation procedure may be completed in advance between devices. Referring to FIG. 7A, FIG. 7B, and FIG. 7C, the information sharing negotiation procedure includes the following steps.

S701: The sending device sends a first negotiation message to the forwarding device.

The first negotiation message is used for determining whether the forwarding device supports providing physical layer channel information, in other words, whether sharing, with another device, physical layer channel information obtained by the forwarding device is supported. The providing physical layer channel information may also be referred to as supporting information subscription.

Generally, compared with the receiving device, the forwarding device collects more physical layer channel information. For example, the forwarding device may collect a quantity of devices of a connected link and traffic of the devices. In the negotiation procedure in this embodiment of this application, the sending device preferentially initiates negotiation to the forwarding device, to obtain more physical layer channel information.

In a possible implementation, when accessing the forwarding device, the sending device sends the first negotiation message to the forwarding device.

It may be understood that after receiving the first negotiation message, the forwarding device determines whether providing the physical layer information to the sending device is supported. If providing the physical layer information is supported, S702a shown in FIG. 7A is performed.

If providing the physical layer information is not supported, S702b shown in FIG. 7B is performed.

S702a: The forwarding device sends a first negotiation response to the sending device.

The first negotiation response indicates that the forwarding device supports providing the physical layer channel information.

S702b: The forwarding device sends a second negotiation response to the sending device, or does not respond to the first negotiation message.

The second negotiation response indicates that the forwarding device does not support providing the physical layer channel information.

It may be understood that, when the forwarding device does not support providing the physical layer information, an information sharing negotiation procedure is executed between the sending device and the receiving device, so that the sending device learns whether the receiving device supports providing the physical layer channel information. In an example, refer to FIG. 7B and FIG. 7C. After S702b, the information sharing negotiation procedure between the sending device and the receiving device includes the following steps.

S703: The sending device sends a second negotiation message to the receiving device.

The second negotiation message is used for determining whether the receiving device supports providing physical layer channel information.

If the receiving device supports providing the physical layer channel information, S704a shown in FIG. 7B is performed. If the receiving device does not support providing the physical layer channel information, S704b shown in FIG. 7A is performed.

S704a: The receiving device sends a third negotiation response to the sending device.

The third negotiation response indicates that the receiving device supports providing the physical layer channel information.

S704b: The receiving device sends a fourth negotiation response or does not respond to the second negotiation message to the sending device.

The fourth negotiation response indicates that the receiving device does not support providing the physical layer channel information.

It can be learned that, by using the foregoing negotiation procedure, devices can obtain a provider of physical layer information through negotiation. The physical layer channel information provided by the forwarding device is preferentially used, so that physical layer channel information of a peer end can be quickly obtained. When the forwarding device does not support providing the physical layer channel information, physical layer channel information provided by an end side (herein, a receiving device side) is used. When neither the forwarding device nor the end side supports providing the physical layer channel information, the sending device uses the physical layer channel information of the transmit link to determine a sending rate.

It can be learned that, in a plurality of scenarios, for example, wireless direct connection and connection between terminal devices via an AP, both the receiving device and the forwarding device may not support information subscription. Compared with the conventional technology in which a device needs to be modified to support a related function, the device is complex, and consequently an application scope is limited. In this embodiment of this application, the provider of the physical layer channel information may be negotiated by using the foregoing negotiation procedure.

When a plurality of devices (the forwarding device and the receiving device) do not support information subscription, the sending device may still determine the sending rate by using the physical layer channel information of the transmit link. It can be learned that in this embodiment of this application, a sending rate can still be determined without modifying a device, and an application scope is not limited.

Based on the foregoing negotiation mechanism, the device may obtain physical layer channel information of another link (namely, physical layer channel information of a link that is not directly connected to the device) from another device. An example in which the sending device obtains the physical layer channel information of the receive link from another device (namely, the forwarding device or the receiving device) is used, to describe a process in which the device obtains physical layer channel information of another link.

For example, both the forwarding device and the receiving device support information subscription. In an example, refer to FIG. 8. S6012 may be implemented as the following steps.

S6012$a$1: The sending device sends a third packet to the forwarding device.

Correspondingly, the forwarding device receives the third packet from the sending device.

The third packet includes a request flag bit.

A technical solution in this embodiment of this application may be applied to an Android (android) system, or may be applied to another system.

Figure 12:
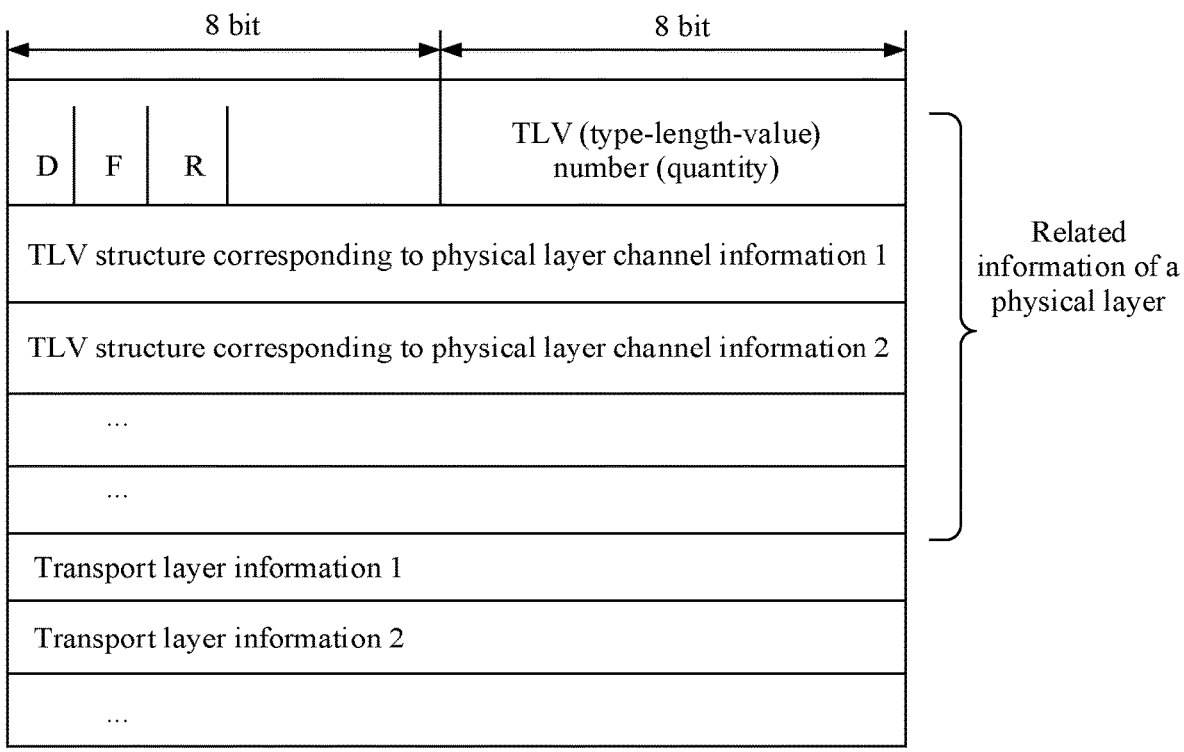
FIG. 12 is a schematic diagram of an encapsulation structure of physical layer channel information according to an embodiment of this application.

In this embodiment of this application, to implement a related function, a new packet format needs to be defined. In a possible implementation, a transport layer protocol may be improved, including improving a format of a transport layer packet. In an example, FIG. 12 shows a format of a packet according to an embodiment of this application. In a transport layer encapsulation processing process, transport layer information (for example, but not limited to a packet loss rate and an RTT) is encapsulated in the packet, and related information of a physical layer is encapsulated in the packet.

The related information of the physical layer includes a user-defined packet header. The user-defined packet header includes a request flag bit (represented by D), a forwarding device flag bit (represented by F), and a receiving device flag bit (represented by R). The related information of the physical layer may further include a type-length-value (TLV) number, physical layer channel information, and the like.

It may be understood that to adapt to the foregoing new packet, protocol stacks of the sending device, the receiving device, and the forwarding device need to support a function of reading and writing a related flag bit.

The request flag bit indicates whether the sending device requests the physical layer channel information of the receive link. The forwarding device flag bit F indicates whether the physical layer channel information is from the forwarding device. The receiving device flag bit R indicates whether the physical layer channel information is from the receiving device. If the request flag bit is set, it indicates that the sending device requests the physical layer channel information of the receive link. If the forwarding device flag bit F is set, it indicates that the physical layer channel information is from the forwarding device. If the receiving device flag bit R is set, it indicates that the physical layer channel information is from the receiving device.

Default statuses of the request flag bit D, the forwarding device flag bit F, and the receiving device flag bit R are default or set to 0.

When there is a service requirement, the sending device may send one or more packets to the receiving device. The sending device may request the physical layer channel information of the receive link from the receiving device or the forwarding device by using a specific packet or some packets in the one or more packets. For example, when starting to send a large file to the mobile phone B, if the mobile phone A sets a request flag bit in a sent packet header to 1, it indicates that physical layer channel information of the receive link is requested. If a TLV number field in the packet is set to 0, it indicates that there is no physical layer channel information currently. For an example description of the TLV number field, refer to the following embodiment.

When the physical layer channel information of the receive link needs to be obtained, the sending device encapsulates a request flag bit D in a to-be-sent packet, sets the request flag bit (in other words, the request flag bit is set to 1), to form a third packet, and sends the third packet to the receiving device via the forwarding device. The set request flag bit D is used for notifying a device on a communication path, for example, the forwarding device (if any) and the receiving device, that the sending device requests the physical layer channel information of the receive link.

On the contrary, when the physical layer channel information of the receive link does not need to be obtained, the sending device sends, to the receiving device via the forwarding device, a packet carrying service data. For implementation of the packet carrying the service data, refer to the conventional technology. Details are not described herein.

Based on improvement of protocols of the transport layer or an upper-layer, the transport layer can sense and extract bottom-layer (for example, physical layer) information. In this way, a sending rate of the transport layer can be calculated subsequently based on the physical layer information.

S6012$b$1: The forwarding device creates a fifth packet.

The fifth packet carries a forwarding device flag bit F, and the forwarding device flag F is set to 1.

It may be understood that, after receiving and decapsulating the third packet, the forwarding device may learn that a request flag bit D in the third packet is set to 1. It indicates that the sending device requests the physical layer channel information of the receive link. If the forwarding device flag bit F in the third packet is default, the forwarding device adds a forwarding device flag bit F to the third packet, and sets the forwarding device flag bit to 1, to form the fifth packet. If the forwarding device flag bit F in the third packet is set to 0 by default, the forwarding device sets the forwarding device flag bit to 1, to form the fifth packet. The forwarding device flag bit indicates that the forwarding device supports obtaining the physical layer channel information of the receive link. Correspondingly, the forwarding device subsequently sends the physical layer channel information of the receive link to the sending device.

S6012$c$1: The forwarding device updates a request record table.

The device maintains the request record table. The request record table is stored in a memory of the forwarding device. The request record table records a correspondence between the sending device, the receiving device, and a request tag. A request flag corresponding to the sending device may be 0 or 1. If the request flag is 1, it indicates that the sending device requests the physical layer channel information of the receive link. If the request flag is 0, it indicates that the sending device does not request the physical layer channel information of the receive link. The following Table 1 is an example structure of the request record table

TABLE 1

| Sending device flag | Receiving device flag | Request flag |
|---|---|---|
| A | B | 1 |
| C | B | 0 |

It may be understood that, after receiving and decapsulating the third packet, the forwarding device may learn that the request flag bit D in the third packet is set to 1. It indicates that the sending device requests the physical layer channel information of the receive link. The forwarding device sets (that is, sets to 1) the request flag corresponding to the sending device (whose flag is A) in the request record table, where the request flag that is set to 1 indicates that the sending device A requests physical layer channel information of a receive link.

S6012$d$1: The forwarding device sends the fifth packet to the receiving device.

Correspondingly, the receiving device receives the fifth packet from the forwarding device.

S6012$e$1: The receiving device determines that the forwarding device flag bit F is valid.

That the forwarding device flag bit F is valid means that the forwarding device flag bit F is set to 1.

It may be understood that the receiving device receives and decapsulates the fifth packet, and obtains a specific situation of the forwarding device flag bit F. The receiving device determines, based on the specific situation of the forwarding device flag bit F, an operation that needs to be performed. In an example, if the forwarding device flag bit F is valid, in other words, the forwarding device flag bit F is set, it indicates that the forwarding device supports information subscription. In this case, the forwarding device provides the physical layer channel information of the receive link for the sending device.

S6012$f$1: The receiving device determines that the request flag corresponding to the sending device in the request record table is not set.

For an example implementation of the request record table of the receiving device, refer to related descriptions of the request record table of the forwarding device. When the sending device requests the physical layer channel information of the receive link, and the receiving device needs to provide the physical layer channel information for the sending device, the receiving device sets the request flag corresponding to the sending device to 1.

S6012$g$1: The receiving device sends a fourth packet to the forwarding device.

Correspondingly, the forwarding device receives the fourth packet from the receiving device.

The fourth packet is a packet returned by the receiving device to the sending device.

In this embodiment of this application, in a possible implementation, when feeding back a packet to the sending device, the receiving device queries a local request record table. When a request flag corresponding to the sending device in the request record table is not set to 1, it indicates that the forwarding device provides the physical layer channel information of the receive link for the sending device, and the receiving device does not need to provide the physical layer channel information of the receive link for the sending device. Therefore, the receiving device determines that when returning the packet to the sending device, the receiving device needs to send the fourth packet in which no physical layer channel information is encapsulated. The receiving device encapsulates to-be-returned data into a packet body of the fourth packet, and sends the fourth packet to the forwarding device.

S6012$h$1: The forwarding device creates a first packet.

The first packet includes the physical layer channel information of the receive link.

In a possible implementation, the forwarding device determines, based on the local request record table, whether to provide the physical layer channel information of the receive link to the sending device. In an example, in the foregoing step S6012$c$1, as shown in the foregoing table 1, the forwarding device has set the request flag corresponding to the sending device. In this step S6012$h$1, the forwarding device determines that the physical layer channel information of the receive link needs to be provided for the sending device. In this case, the forwarding device encapsulates the physical layer channel information into the fourth packet, to form the first packet, and sends the first packet to the sending device.

In a possible implementation, the physical layer channel information is encoded and encapsulated in a TLV format, and is sent to a peer device. Each piece of physical layer channel information corresponds to one TLV structure, and a plurality of pieces of physical layer channel information form an information vector <TLV1, TLV2, TLV3 . . . >. The type indicates an information type or an information name, and may be any type of physical layer channel information. For example, a type field occupies 4 bits. The value indicates a value of the physical layer channel information. For example, a maximum quantity of bytes of a value field is 16 bytes. The length indicates a quantity of value bytes of the physical layer channel information. For example, a length field occupies 4 bits. A TLV number indicates a quantity of TLVs corresponding to currently encapsulated physical layer channel information.

The one or more pieces of physical layer channel information may be encapsulated in a packet header or a packet body of a packet. For example, an option field of an IP packet, an option field of a TCP packet, a packet body or a packet header of a User Datagram Protocol (UDP)-based user-defined protocol (as shown in FIG. 12), another proprietary protocol packet, and another network field.

For example, the physical layer channel information is a physical layer rate, and the forwarding device encapsulates obtained physical layer rate of the receive link into the first packet. A TLV number in the first packet, namely, a quantity of TLVs of the currently encapsulated physical layer rate, is currently set to 1. In a TLV structure corresponding to the physical layer rate, a value of a type field is the physical layer rate (code is 001), a value of a length field is 4 (indicating that a value part occupies 4 bytes), and a value of a value field is the physical layer rate, where a unit may be, for example, Kbps.

In another possible implementation, the forwarding device determines, based on a receiving device flag bit R in the fourth packet, whether to provide the physical layer channel information of the receive link for the sending device. In an example, if the receiving device flag bit R is set to 0 or is default, it indicates that the receiving device does not provide the physical layer channel information of the receive link for the sending device, and the forwarding device needs to provide the physical layer channel information of the receive link for the sending device. In this case, the forwarding device encapsulates the physical layer channel information into the fourth packet, to form the first packet, and sends the first packet to the sending device.

S6012*i*1: The forwarding device sends the first packet to the sending device.

Correspondingly, the sending device receives the first packet from the forwarding device.

For example, a transport layer of the forwarding device receives information from an upper layer (for example, a session layer), and processes the information at the transport layer. In an example, the forwarding device encapsulates transport layer information (for example, a packet loss rate and an RTT) and physical layer channel information (for example, a physical layer rate) of the receive link based on the session layer information, and sends encapsulated information to a lower layer protocol stack (for example, a network layer) of the transport layer for processing. By analogy, the sending device obtains the first packet through encapsulation by layer-by-layer protocol stack processing. The transport layer information and the physical layer channel information of the receive link are encapsulated in a part corresponding to the transport layer in the first packet.

In this way, the sending device receives and decapsulates the first packet, and may obtain the physical layer channel information of the receive link carried in the first packet. For example, after receiving the first packet, the sending device decapsulates the first packet at the transport layer, to obtain the transport layer information and the physical layer channel information of the receive link.

Figure 8:
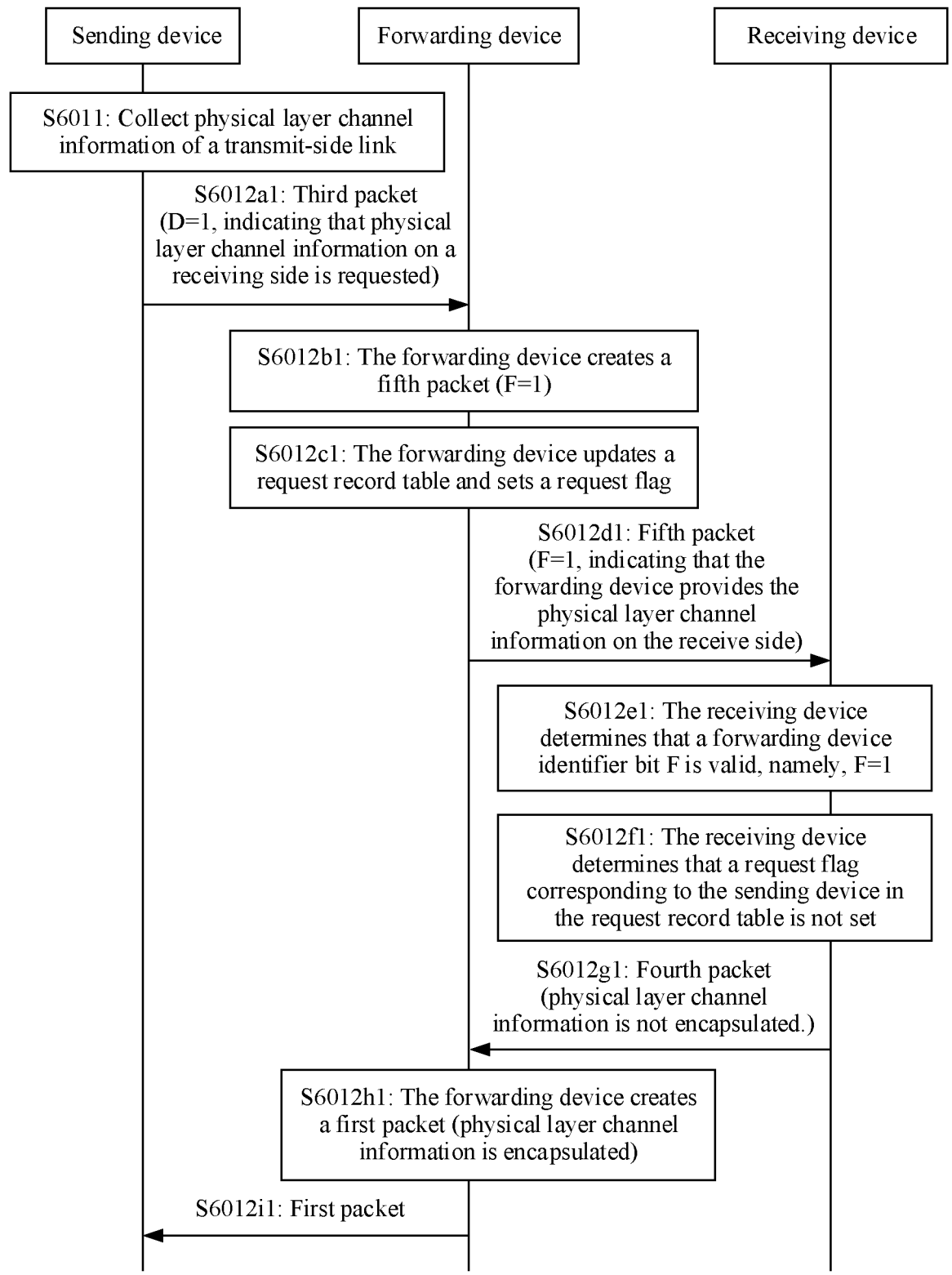
FIG. 8 to FIG. 11 are schematic flowcharts of a method for adjusting a sending rate according to an embodiment of this application.

In the embodiment corresponding to FIG. 8, an example in which the forwarding device sends the physical layer channel information to the sending device in an out-band manner is mainly used, to describe an implementation process in which the sending device obtains the physical layer channel information from the forwarding device. It may be understood that the forwarding device may alternatively send the physical layer channel information to the sending device in an in-band manner. For details, refer to the conventional technology. Details are not described herein in this embodiment of this application.

For example, the forwarding device supports information subscription, and the receiving device does not support information subscription. In an example, refer to FIG. 9. S6012 may be performed as the following steps.

S6012*a*2: The sending device sends a third packet to the forwarding device.

Correspondingly, the forwarding device receives the third packet from the sending device. The third packet carries a request flag bit D, and the request flag bit D is set to 1.

S6012*b*2: The forwarding device creates a fifth packet.

The fifth packet carries a forwarding device flag bit F, and the forwarding device flag F is set to 1.

S6012*c*2: The forwarding device updates a request record table.

A request flag corresponding to the sending device in the request record table of the forwarding device (whose flag is A) is set (that is, set to 1), where the request flag that is set to 1 indicates that the sending device A requests physical layer channel information of a receive link.

S6012*d*2: The forwarding device sends the fifth packet to the receiving device.

Correspondingly, the receiving device receives the fifth packet from the forwarding device.

For an implementation principle of S6012*a*2 to S6012*d*2, refer to S6012*a*1 to S6012*d*1. Details are not described herein again.

S6012*e*2: The receiving device sends a fourth packet to the forwarding device.

The fourth packet is a packet returned by the receiving device to the sending device.

It may be understood that, if the receiving device does not support information subscription, after receiving and decapsulating the fifth packet, the receiving device sends, to the sending device, the fourth packet in which no physical layer channel information of the receive link is encapsulated.

S6012*f*2: The forwarding device creates a first packet.

The first packet includes the physical layer channel information of the receive link.

Herein, for an implementation of S6012*f*2, refer to S6012*h*1. Details are not described herein again.

S6012*g*2: The forwarding device sends the first packet to the sending device.

Correspondingly, the sending device receives the first packet from the forwarding device.

In this way, the sending device receives and decapsulates the first packet, and may obtain the physical layer channel information of the receive link carried in the first packet.

For example, the forwarding device does not support information subscription, and the receiving device supports information subscription. In an example, refer to FIG. 10. S6012 may be implemented as the following steps.

S6012*a*3: The sending device sends a third packet to the forwarding device.

Correspondingly, the forwarding device receives the third packet from the sending device. The third packet carries a request flag bit D, and the request flag bit D is set to 1.

For an implementation principle of S6012*a*3, refer to S6012*a*1.

S6012*b*3: The forwarding device sends the third packet to the receiving device.

Correspondingly, the receiving device receives the third packet from the forwarding device.

It may be understood that, if the forwarding device does not support information subscription, for an implementation of S6012*b*3, refer to the conventional technology. For example, the forwarding device performs transparent transmission (or referred to as a forwarding action), and directly forwards the third packet. In this case, because the forwarding device does not set the forwarding device flag bit F in the third packet, the forwarding device flag bit F is in a default status, that is, is default or is 0.

S6012*c*3: The receiving device determines that the request flag bit D is set and the forwarding device flag bit F is invalid, and sets the request flag corresponding to the sending device in the request record table.

That the forwarding device flag bit F is invalid means that the forwarding device flag bit F is default or set to 0.

It may be understood that the receiving device receives and decapsulates the third packet, obtains the forwarding device flag bit F and the request flag bit D, and determines, based on the forwarding device flag bit F and the request flag bit D, an operation that needs to be performed. In an example, when the request flag bit D is set, and the forwarding device flag bit F is set to 0 or default, it indicates that the sending device requests the physical layer channel information of the receive link, but the forwarding device does not support information subscription. In this case, the receiving device needs to provide the physical layer channel information of the receive link for the sending device. In this case, the receiving device sets the request flag corresponding to the sending device in the local request record table, where the set request flag indicates that the sending device requests the physical layer channel information of the receive link, and indicates that the physical layer channel information is provided by the receiving device for the sending device.

For an implementation of the request record table of the receiving device, refer to related descriptions of the request record table of the forwarding device.

S6012d3: The receiving device creates a second packet.

The second packet carries the physical layer channel information of the receive link. Optionally, a receiving device flag bit R in the second packet is set.

When feeding back a packet to the sending device, the receiving device first queries a local request record table. When a request flag corresponding to the sending device in the request record table is not set, it indicates that the sending device requests the physical layer channel information of the receive link, and the receiving device needs to provide the physical layer channel information for the sending device. In this case, the receiving device sets the receiving device flag bit R in the returned packet (namely, the second packet), and encapsulates the physical layer channel information of the receive link in the second packet. The set receiving device flag bit R indicates that the physical layer channel information is provided by the receiving device for the sending device. For example, in a processing process of the transport layer, the receiving device encapsulates the physical layer channel information of the receive link and the transport layer information, and sends encapsulated information to a lower layer (for example, a network layer) for processing. Finally, the receiving device obtains the second packet through layer-by-layer protocol stack processing. The transport layer information and the physical layer channel information of the receive link are encapsulated in a part corresponding to the transport layer in the second packet. For example, for a part of content of the second packet, refer to FIG. 12.

S6012e3: The receiving device sets the request flag corresponding to the sending device in the request record table to 0.

It may be understood that, to prevent the receiving device from continuously feeding back physical layer channel information of the receive link to the sending device, the receiving device sets the request flag corresponding to the sending device to 0.

S6012f3: The receiving device sends the second packet to the sending device.

In a possible implementation, the receiving device feeds back the second packet to the sending device via the forwarding device. Optionally, the receiving device sends the second packet to the sending device in an in-band manner via the forwarding device.

When neither the forwarding device nor the receiving device supports information subscription, the sending device obtains the physical layer channel information of the transmit link, and determines the sending rate based on the physical layer channel information of the transmit link.

Figure 9:
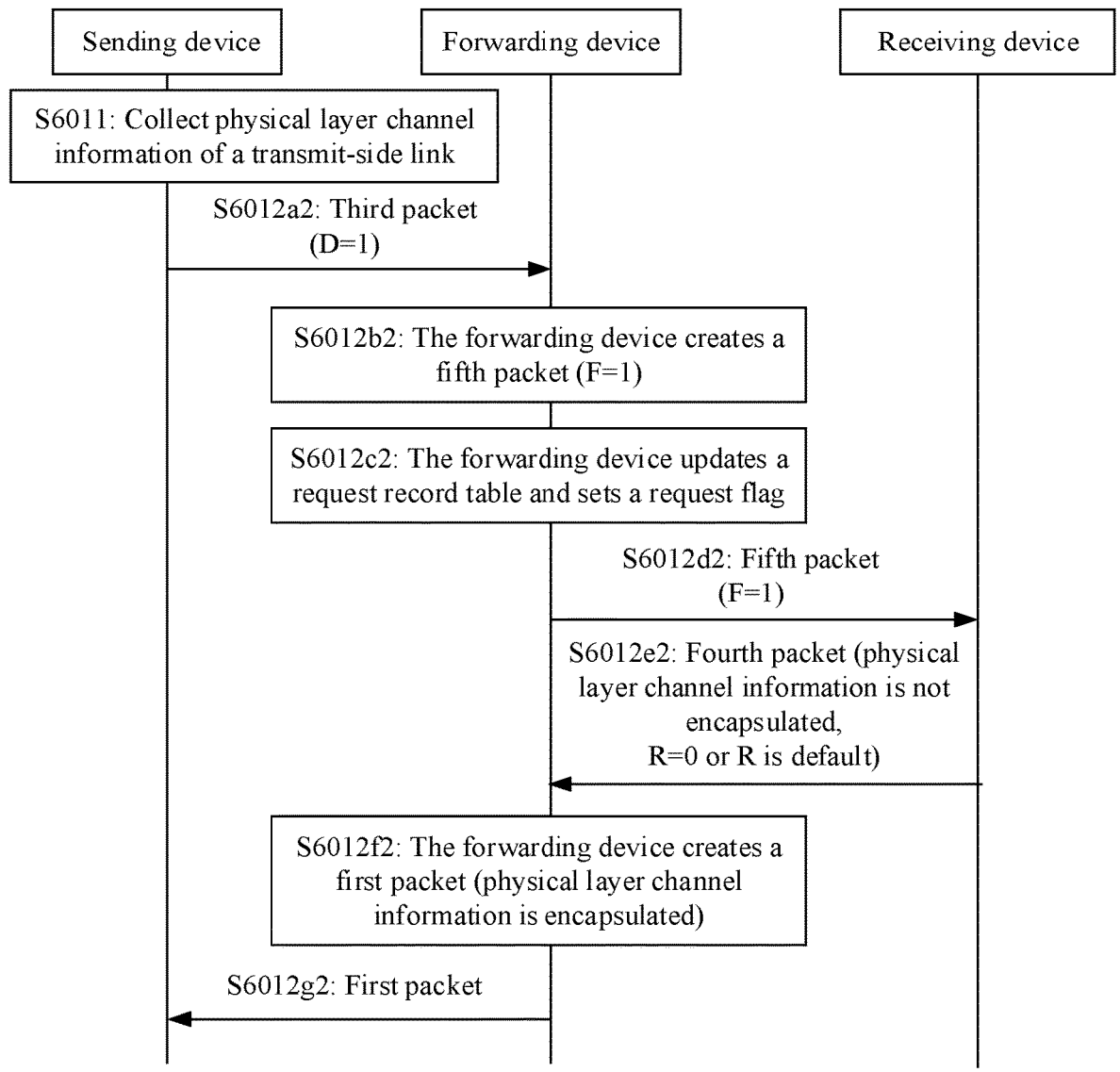
Figure 10:
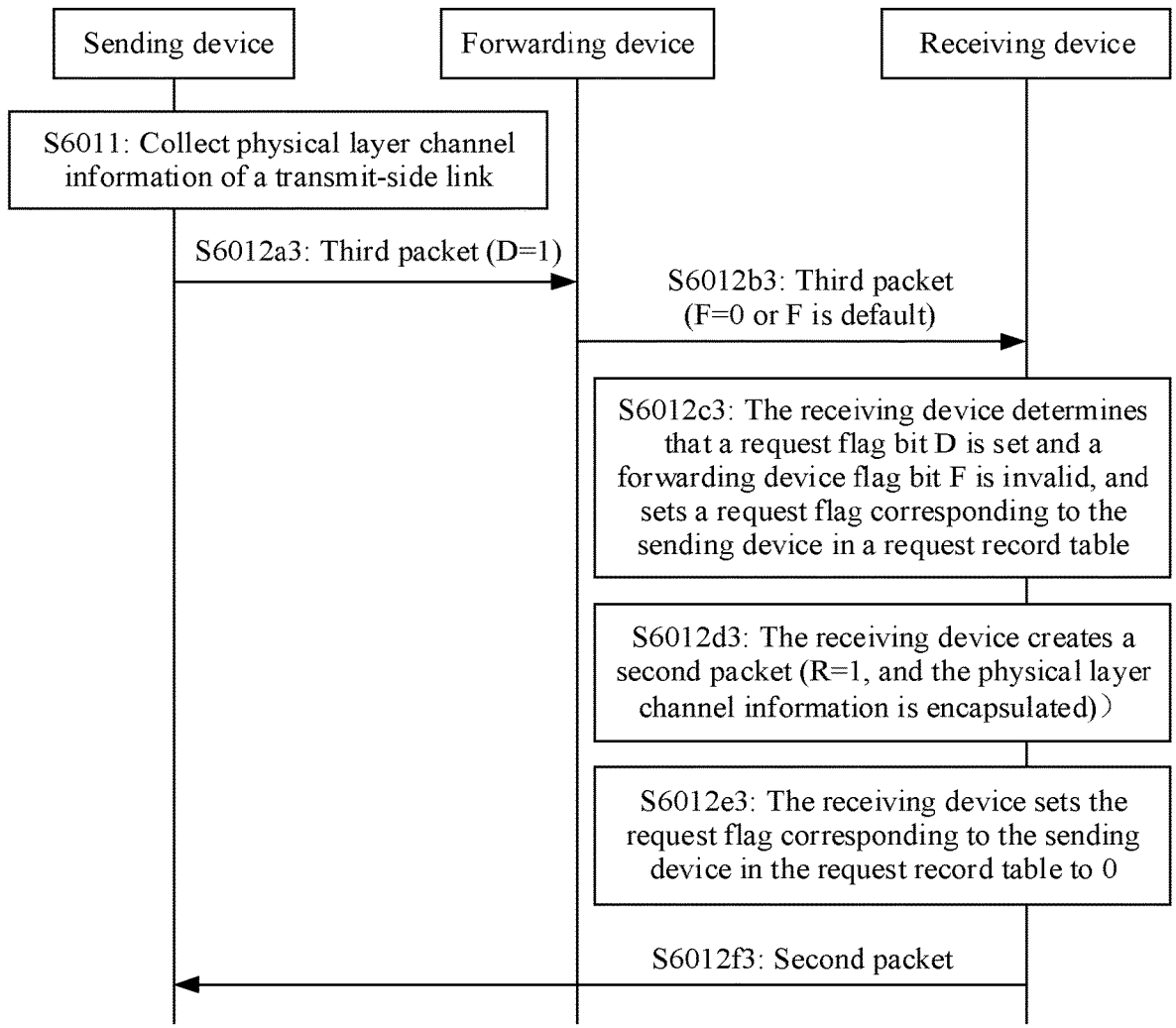

In this embodiment of this application, the sending device may perform, based on a preset policy, the embodiment corresponding to FIG. 8, FIG. 9, or FIG. 10, to obtain the physical layer channel information of the receive link.

In a possible implementation, the preset policy may be: obtaining physical layer channel information of the receive link at a fixed interval. In a possible design, a timer is started at a moment at which a packet is sent (a request flag bit D carried in the packet is set to 1). Before the timer times out, a request flag bit D in a packet sent again by the sending device is set to a default value or is set to 0, and after the timer times out, a request flag bit D in a packet sent by the sending device again is set to 1. In other words, the timer is started at a specific interval, the sending device sets a request flag bit D to 1, and sends, to the receiving device, a packet carrying the request flag bit D whose value is 1, to trigger a process of obtaining the physical layer channel information of the receive link from the receiving device or the forwarding device. The moment at which the timer is started, timing duration, and the like may be set differently. This is not limited in this embodiment of this application.

Alternatively, the preset policy may be obtaining physical layer channel information of the receive link at an interval of a fixed quantity of packets. Alternatively, physical layer channel information of the receive link may be obtained at an interval of one or more smooth RTTs. There may be other preset policy. A design of the preset policy is not limited in this embodiment of this application.

It can be learned that in near-field wireless communication, by using the foregoing physical layer channel information sharing or exchange method, the sending device may obtain physical layer channel information of all links on the communication path. In an example, the sending device masters a global view of an intermediate network. In this way, a sending rate subsequently calculated based on information about the global view is more accurate.

S602: The sending device adjusts the sending rate of the transport layer of the sending device based on the physical layer channel information of the transmit link, the physical layer channel information of the receive link, and the transport layer information.

Figure 11:
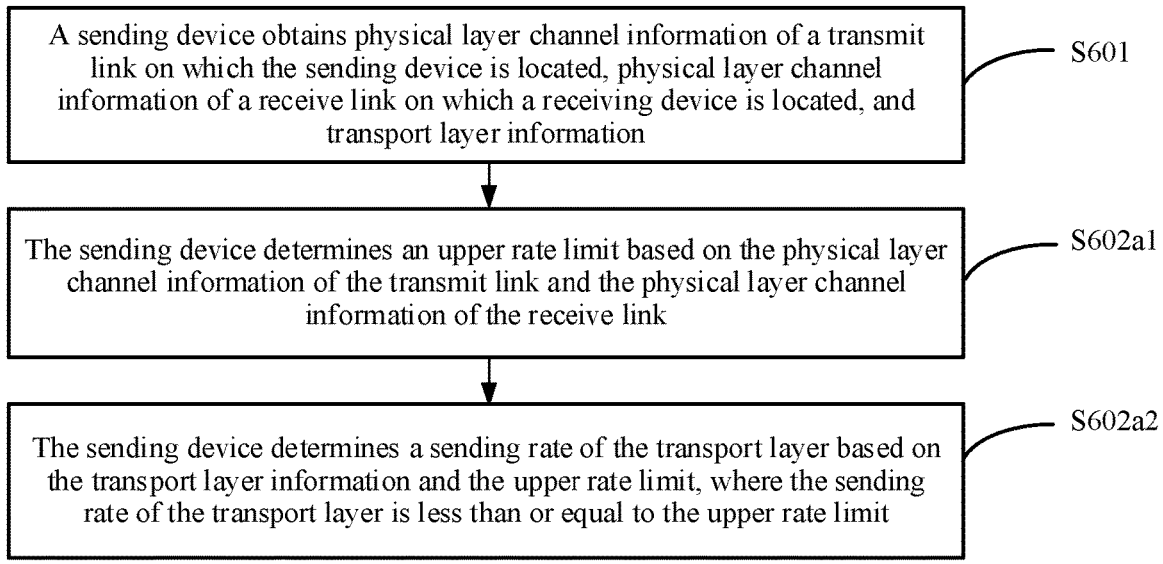

In a possible implementation, refer to FIG. 11. S602 may be further implemented as follows: S602a1: The sending device determines an upper rate limit based on physical layer channel information of the transmit link and the physical layer channel information of the receive link. S602a2: The sending device determines the sending rate of the transport layer based on the transport layer information and the upper rate limit, where the sending rate of the transport layer is less than or equal to the upper rate limit.

Physical layer channel information used for determining the upper rate limit in S602a1 may be the physical layer channel information of the transmit link (in other words, is not based on the foregoing information sharing mechanism).

Alternatively, physical layer channel information used for determining the upper rate limit in S602a1 includes the physical layer channel information of the transmit link and the physical layer channel information of the receive link (in other words, is based on the foregoing information sharing mechanism). In this way, the sending device masters physical layer channel information of global links, and an upper rate limit calculated based on the global information is more accurate.

It should be noted that different channel statuses may correspond to different upper rate limits.

In an example, when there is interference contention between the transmit link and the receive link, the sending device may calculate the upper rate limit according to the following formula (1):

$$V_{max}=V_1*V_2/(V_1+V_2) \qquad (1)$$

Alternatively, when there is no interference contention between the transmit link and the receive link, the sending device may calculate the upper rate limit according to the following formula (2):

$$V_{max}=V_2) \qquad (2)$$

$$V_1=C_1*R_1*I_1 \pm D_1, \text{and } V_2=C_2*R_2*I_2 \pm D_2.$$

$V_1$ represents a maximum rate of the transmit link, $R_1$ represents a physical layer rate of the transmit link, $C_1$ represents a valid data proportion of the transmit link, and $I_1$ represents an interference factor of the transmit link. The interference factor $I_1$ of the transmit link is related to the quantity of access devices of the transmit link and traffic of each access device. $D_1$ represents a second deviation factor. $D_1$ is related to a protocol type, a device type, or other factors.

$V_2$ represents a maximum rate of the receive link, $R_2$ represents a physical layer rate of the receive link, $C_2$ represents a valid data proportion of the receive link, and $I_2$ represents an interference factor of the receive link. The interference factor $I_2$ of the receive link is related to the quantity of access devices of the receive link and traffic of each access device. $D_2$ represents a third deviation factor.

Physical layer channel information used for calculating the upper rate limit includes but is not limited to a physical layer rate, a link access device, traffic of each device, and a quantity of aggregated physical layer frames.

A valid data proportion of a link is determined by a proportion relationship between valid data and total data of the link, and the total data includes valid data and control information. Optionally, the sending device may calculate the valid data proportion of the transmit link according to the following formula (3):

$$C_1 = \frac{T_{data1}}{T_{data1} + T_{control1}} = \frac{\frac{N_1 * DataSize1}{R_1}}{\frac{N_1 * DataSize1}{R_1} + T_{control1}} \quad (3)$$

$T_{data1}$ indicates sending duration of the valid data, $N_1$ indicates a quantity of aggregated physical layer frames of the transmit link, DataSize1 indicates a size of a maximum transmission unit (MTU), $R_1$ indicates the physical layer rate of the transmit link, and $T_{control1}$ indicates sending duration of control information transmitted over the transmit link. For the sending duration of the control information, refer to the conventional technology.

For example, if a frame aggregation technology and a CTS/RTS mechanism are used, $T_{control1}$ may be calculated by using the following formula:

$T_{control1}$=DIFS+backoff+RTS+SIFS+CTS+DIFS+ SIFS+ACK+t1+Δt, where DIFS is a distributed coordination function interframe space, SIFS is a short interframe space, backoff is backoff duration, ACK is duration of an acknowledgment message, t1 is duration of a field such as a physical layer convergence protocol (PLCP) header field (which may be 5 or set differently), RTS is request to send frame duration, CTS is clear to send frame duration, and Δt is a compensation duration (which may be set to 30 μs or another value).

Optionally, the sending device may calculate the valid data proportion of the receive link according to the following formula (4):

$$C_2 = \frac{T_{data2}}{T_{data2} + T_{control2}} = \frac{\frac{N_2 * DataSize2}{R_2}}{\frac{N_2 * DataSize2}{R_2} + T_{control2}} \quad (4)$$

$T_{data2}$ indicates sending duration of the valid data, $N_2$ indicates a quantity of aggregated physical layer frames of the transmit link, DataSize2 indicates a size of a maximum transmission unit MTU, $R_2$ indicates the physical layer rate of the transmit link, and $T_{control2}$ indicates sending duration of control information transmitted over the transmit link.

$N_1$ and $N_2$ may be set based on a current sending rate (for example, set to 2, 4, 8, or 16). For example, DataSize can be set to but is not limited to 1400 bytes.

In a possible implementation, an AP determines, based on a protocol version run by the AP, whether there is interference between the transmit link and the receive link, and then calculates the upper rate limit in the foregoing calculation manner.

It has mentioned in the foregoing embodiment that, in a process in which the sending device communicates with the receiving device, the sending device may obtain the physical layer channel information periodically or according to another preset policy. Correspondingly, the sending device may calculate the upper rate limit periodically or according to another preset policy, to update the upper rate limit.

In a possible implementation, the upper rate limit may be an end granularity. In an example, a communication source end (namely, the sending device) and a destination end (namely, the receiving device) are used as a control granularity, and an upper rate limit between the sending device and the receiving device is set to $V_{max}$.

Alternatively, the upper rate limit may be a granularity of a data stream. That is, when there are a plurality of data streams between the sending device and the receiving device, the upper rate limit $V_{max}$ may be allocated based on a bandwidth requirement and/or a priority of the data streams and/or another parameter. An allocation algorithm can be flexibly designed. For example, for a data stream (a data stream 1) with a highest bandwidth requirement in the plurality of data streams, the upper rate limit of the data stream is set to $V_{max}$, and for data streams other than the data stream 1 in the plurality of data streams, the upper rate limit is set to f(bandwidth)*$V_{max}$ Bandwidth indicates a required bandwidth. f (bandwidth) is a function of bandwidth. A function value is usually less than or equal to 1. Alternatively, the upper rate limit of all streams is set to f (bandwidth). Alternatively, there is another setting method. This is not limited in this embodiment of this application.

Alternatively, when priorities or bandwidth requirements of the data streams are uncertain or equal, the upper rate limit $V_{max}$ may be used as an input of a congestion control algorithm. In other words, an upper rate limit of congestion control is input, and a rate of each stream is adjusted with reference to a stream-based end-to-end congestion control algorithm in the conventional technology.

In this embodiment of this application, if a real bandwidth changes greatly in a near-field wireless communication environment, an upper rate limit of a communication path can be accurately estimated based on a real status of a physical channel.

After calculating the upper rate limit according to formulas (1), (3), (2), and (4), the sending device may determine the sending rate based on the upper rate limit and one or more pieces of transport layer information.

The sending rate of the transport layer meets the following relationship: Sendrate=$V_{max}$*$f_{trans}$+Ra, where Sendrate is the sending rate of the transport layer, $V_{max}$ is the upper rate limit, and $f_{trans}$ is related to the transport layer information. Optionally, $f_{trans}$ is a function that uses the transport layer information as an independent variable, and Ra is a first deviation factor. A value of Ra may be a positive value, a negative value, or 0.

For example, the sending rate is determined based on the upper rate limit $V_{max}$ and the packet loss rate. In a possible implementation, if the packet loss rate is greater than or equal to a first threshold, the sending device determines the sending rate (Sendrate) as $V_{max}*f$ (lossrate). If the packet loss rate is less than a first threshold, the sending device determines the sending rate as $V_{max}$. The first threshold may be flexibly set based on a specific application scenario, for example, determined based on an empirical value or a statistical value. For example, the packet loss rate is set to 10%. In an example, the packet loss rate may alternatively be another value. This is not limited in this embodiment of this application. f (lossrate) is a function that uses the packet loss rate as an independent variable, and a function value is usually less than 1. Optionally, a larger packet loss rate indicates a smaller function value.

For example, after calculating the upper rate limit $V_{max}$, the sending device first sets the upper rate limit $V_{max}$ to the sending rate when starting transmission. Then, in a process of sending a packet to the receiving device, the sending device may detect the packet loss rate periodically or in real time, and dynamically adjust the sending rate based on a packet loss rate calculated by a sender on which a packet loss occurs. In an example, when the sending device detects that the packet loss rate is greater than or equal to the first threshold, it indicates that a severe packet loss may be caused by a current large rate. In this case, the sending device decreases the sending rate, to avoid a severe packet loss. When the sending device detects that the packet loss rate is less than the first threshold, the sending rate may be set to the upper rate limit $V_{max}$. In this way, the sending rate is ensured, and no severe packet loss occurs.

Certainly, there may be another manner of determining the sending rate based on the packet loss rate and the upper rate limit. Details are not listed one by one in this embodiment of this application.

In the conventional technology, end-to-end transport layer information needs to be considered for rate adjustment at a transport layer. For example, when a sender sends data to a receiver, whether the receiver feeds back the data, and a value of a delay need to be considered. If a sending rate of the transport layer is high, packet loss may occur. In addition, because the transport layer information is usually end-to-end information, and the end-to-end information needs to be obtained after a process such as sending and feedback is performed between the sender and the receiver, rate adjustment at the transport layer is usually not timely. Compared with the conventional technology, in the method for adjusting a sending rate provided in this embodiment of this application, rate adjustment is performed based on physical layer channel information. By using the physical layer channel information, a sending device may learn of a quantity of hops included in an intermediate network, and can infer a status such as bandwidth of the intermediate network. On one hand, a real physical layer rate of a communication link can be matched, and a probability of packet loss or queuing caused by mismatch between a sending rate and a physical layer rate of a communication link is reduced. On the other hand, a bandwidth can be fully utilized, transmission efficiency can be improved, and data transmission time can be reduced.

In addition, the sending device can not only obtain the physical layer channel information of the transmit link, but also obtain the physical layer channel information of the receive link by using a sharing mechanism. In other words, the sending device can learn global information of the intermediate network, and the sending rate calculated based on global information is more accurate.

Further, in this embodiment of this application, more accurate physical layer channel information and transport layer network status information (representing an instant network status) may be combined, to perform rate adjustment more accurately and timely, and improve network QoS. The QoS includes throughput and a delay.

Figure 13A:
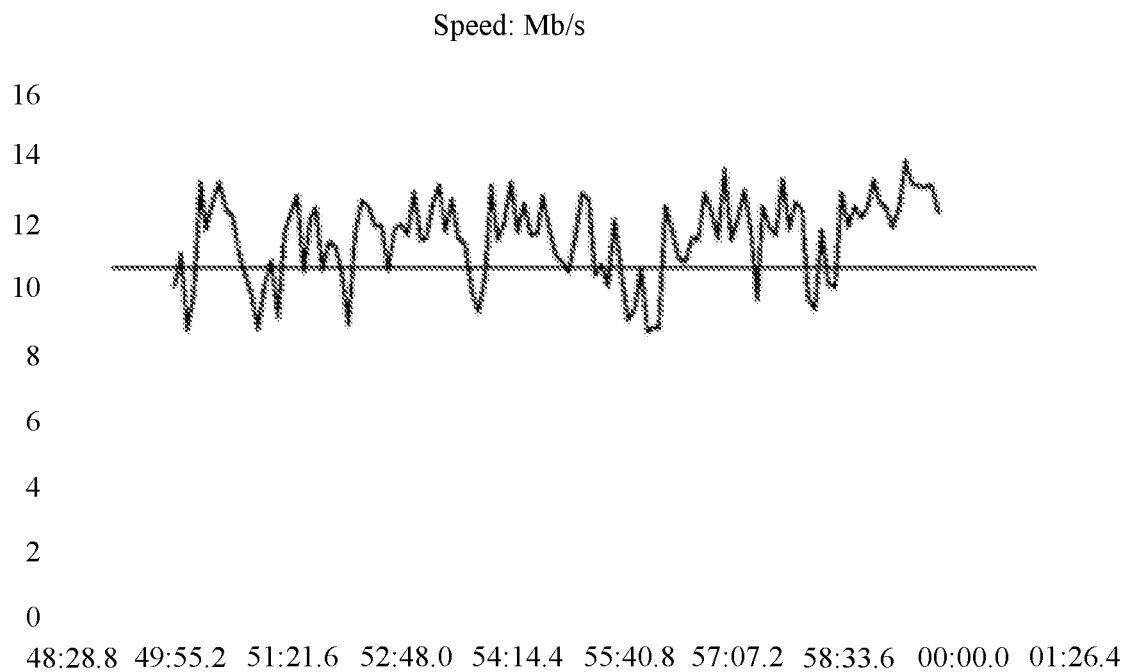
FIG. 13A and FIG. 13B are schematic diagrams of test scenarios according to an embodiment of this application.
Figure 13B:
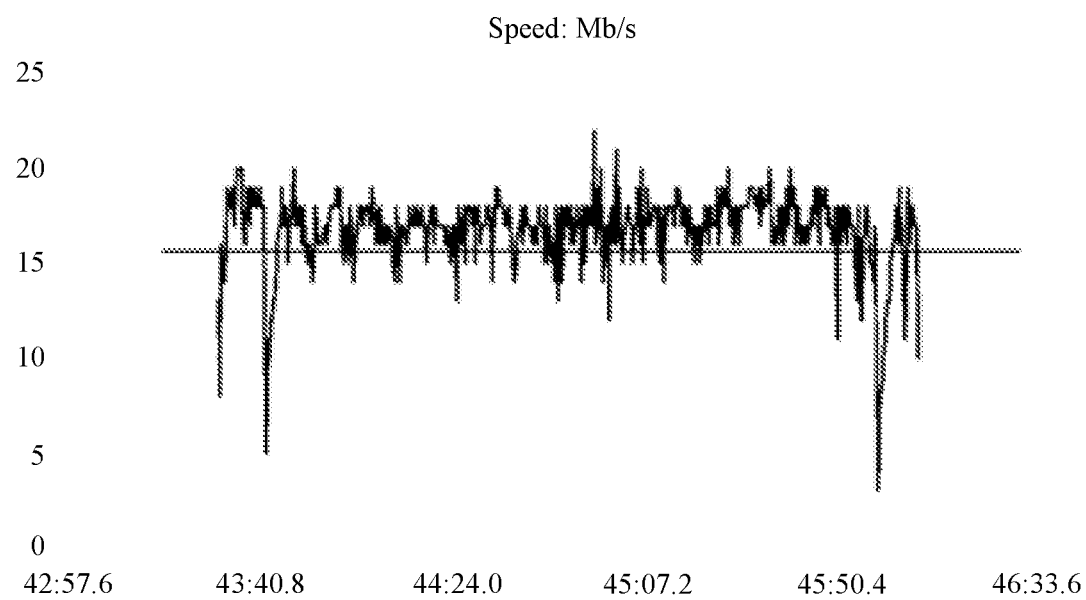

For example, FIG. 13B shows a sending rate for implementing near-field communication by using the technical solution in this embodiment of this application. Compared with the conventional technology (where an average sending rate is 11.8 megabytes per second (MB/s)) shown in FIG. 13A, in the method for adjusting a sending rate in this embodiment of this application, an average sending rate is increased (which can approximately reach 16.7 MB/s).

It may be understood that, to implement the foregoing functions, the communication device (the sending device, the forwarding device, or the receiving device) includes corresponding hardware structures and/or software modules for performing the functions. A person skilled in the art should be easily aware that, in combination with the examples described in embodiments disclosed in this specification, units, algorithms, and steps may be implemented by hardware or a combination of hardware and computer software in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of this application.

In embodiments of this application, functional modules of the communication device (the sending device, the forwarding device, or the receiving device) may be divided based on the foregoing method examples. For example, each functional module may be divided corresponding to each function, or two or more functions may be integrated into one processing module. The integrated module may be implemented in a form of hardware, or may be implemented in a form of a software functional module. It should be noted that, in embodiments of this application, module division is an example, and is merely a logical function division. During actual implementation, another division manner may be used.

Figure 14:
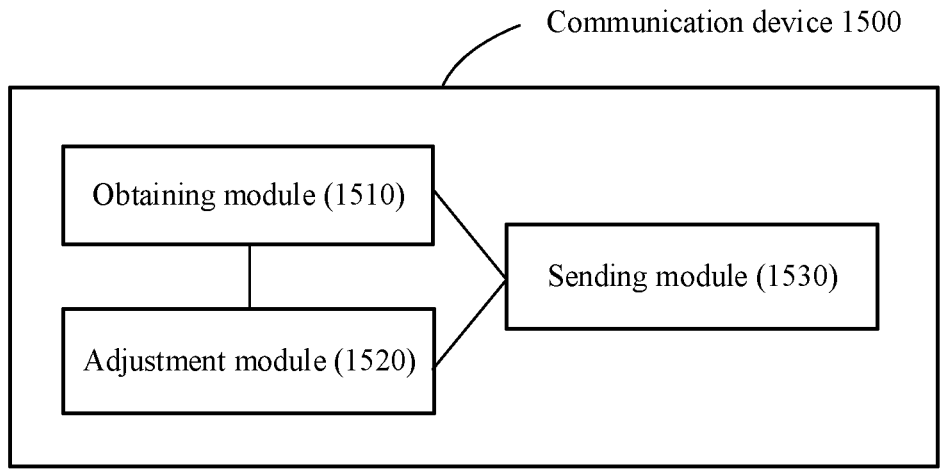
FIG. 14 to FIG. 16 are schematic diagrams of communication apparatuses according to embodiments of this application.

When an integrated unit is used, FIG. 14 is a schematic diagram of a possible structure of a communication device in the foregoing embodiment. The communication apparatus may be the sending device or a component (for example, a chip system) in the sending device or another component that supports a function of the sending device. The communication device 1500 includes an obtaining module 1510 and an adjustment module 1520.

The obtaining module 1510 is configured to support the communication device in performing S601, S6011, and S6012 in the foregoing method embodiments, and/or another process used for the technology described in this specification. The adjustment module 1520 is configured to support the communication device in performing S602 in the foregoing method embodiment, and/or is configured to perform another process of the technology described in this specification.

The obtaining module 1510 is further configured to support the communication device in performing S702*a*, S702*b*, S704*a*, S702*b*, S6012*i*1, S6012*g*2, S6012*f*3 and S1101 in the foregoing method embodiment.

The adjustment module 1520 is further configured to support the communication device in performing S602*a*, S602*a*1, and S602*a*2 in the foregoing method embodiment.

Further, the communication device 1500 may further include a sending module 1530, configured to support the communication device in performing the S701, S703, S6012a1, S6012a2 and S6012a3 in the foregoing method embodiment, and/or another process of the technology described in this specification.

Optionally, the communication device may further include a storage module (not shown in the figure).

Figure 15:
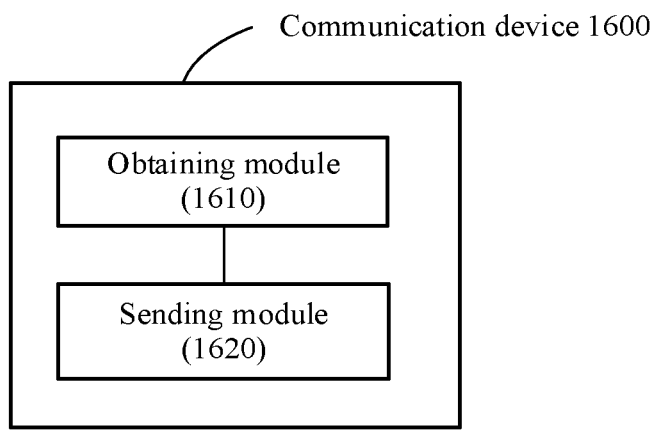

FIG. 15 is a schematic diagram of a possible structure of a communication device used in the foregoing embodiment. The communication device may be the forwarding device, a component (for example, a chip system) in the forwarding device, or another component that supports a function of the forwarding device. The communication device 1600 includes an obtaining module 1610 and a sending module 1620.

The obtaining module 1610 is configured to support the communication device in collecting physical layer channel information of a receive link, and/or used in another process of the technology described in this specification.

The sending module 1620 is configured to support the communication device in performing S702a, S702b, S6012d1, S6012i1, S6012d2, S6012g2, S6012b3 and S6012f3 in the foregoing method embodiment, and/or is configured to perform another process of the technology described in this specification.

Further, the communication device 1600 may further include a receiving module (not shown in the figure), configured to support the communication device in performing S701, S6012a1, S6012g1, S6012a2, S6012e2, S6012a3 and S6012f3 in the foregoing method embodiment, and/or another process of the technology described in this specification.

Further, the communication device 1600 may further include a creation module and an updating module (not shown in the figure). The creation module is configured to support the communication device in performing S6012b1, S6012h1, S6012b2 and S6012f2 in the foregoing method embodiment, and/or is configured to perform another process used for the technology described in this specification.

The updating module is configured to support the communication device in performing S6012c1, and S6012c2 in the foregoing method embodiment, and/or another process used for the technology described in this specification.

Optionally, the communication device may further include a storage module (not shown in the figure).

Figure 16:
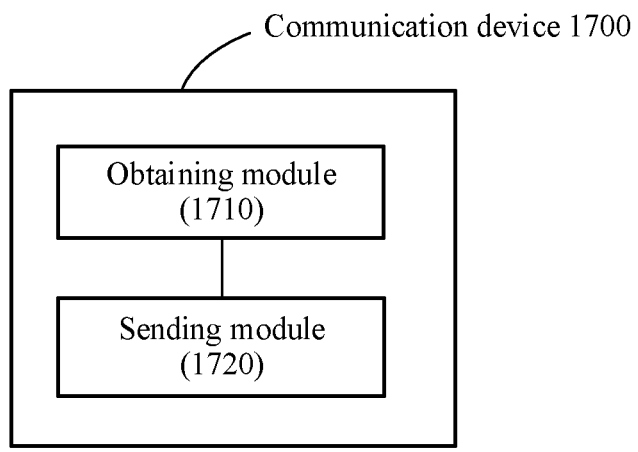

FIG. 16 is a schematic diagram of a possible structure of a communication device used in the foregoing embodiment. The communication device is the receiving device, a component (for example, a chip system) in the receiving device, or another component that supports a function of the receiving device. The communication device 1700 includes an obtaining module 1710 and a sending module 1720.

The obtaining module 1710 is configured to support the communication device in collecting physical layer channel information of a receive link, and/or used in another process of the technology described in this specification.

The sending module 1720 is configured to support the communication device in performing S704a, S704b, S6012g1, S6012e2 and S6012f3 in the foregoing method embodiment, and/or another process used for the technology described in this specification.

Further, the communication device 1700 may further include a receiving module (not shown in the figure), configured to support the communication device in performing S703, S6012d1, S6012d2, and S6012b3 in the foregoing method embodiment, and/or another process of the technology described in this specification.

Further, the communication device 1700 may further include a creation module, an updating module, and a determining module (not shown in the figure).

The creation module is configured to support the communication device in performing S6012d3 in the foregoing method embodiment, and/or another process used for the technology described in this specification.

The determining module is configured to support the communication device in performing S6012e1, S6012f1, and S6012c3 in the foregoing method embodiment, and/or another process used for the technology described in this specification.

The updating module is configured to support the communication device in performing S6012e3 in the foregoing method embodiment, and/or another process of the technology described in this specification.

Optionally, the communication device may further include a storage module (not shown in the figure).

When an integrated unit is used, the foregoing modules other than the sending module and the receiving module may be integrated into one processing module for implementation. The processing module may be a processor or a controller, for example, may be a CPU, a general-purpose processor, a DSP, an ASIC, a field-programmable gate array (FPGA), another programmable logic component, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

The receiving module and the sending module may be a communication module of a communication device (for example, a mobile phone), such as a radio frequency (RF) circuit, a WIFI module, or a BLUETOOTH module, or a communication interface shown in FIG. 4.

For example, when the processing module is the processor shown in FIG. 4, the storage module is the memory 403 shown in FIG. 4, and the communication module is the communication interface 404 shown in FIG. 4, the communication device provided in this application may be the communication device 400 shown in FIG. 4. The receiving module and the sending module may not only include a radio frequency circuit, but also include a WIFI module and a BLUETOOTH module. The communication modules such as the radio frequency circuit, the WIFI module, and the BLUETOOTH module may be collectively referred to as a communication interface. The processor, the communication interface, and the memory may be coupled together through a bus.

An embodiment of this application further provides a chip system. The chip system is applied to the foregoing communication device. The chip system includes one or more interface circuits and one or more processors. The interface circuit and the processor are interconnected by using a cable. The interface circuit is configured to receive a signal from a memory of the communication device, and send the signal to the processor. The signal includes computer instructions stored in the memory. When the processor executes the computer instructions, the communication device performs the method performed by the sending device in the foregoing method embodiment, or performs the method performed by the forwarding device in the foregoing method embodiment, or performs the method performed by the receiving device in the foregoing method embodiment.

An embodiment of this application further provides a computer storage medium. The computer storage medium includes computer instructions. When the computer instructions are run on a communication device, the communication device is enabled to perform the method performed by the sending device in the foregoing method embodiment, or perform the method performed by the forwarding device in the foregoing method embodiment, or perform the method performed by the receiving device in the foregoing method embodiment.

An embodiment of this application further provides a computer program product. When the computer program product runs on a computer, the computer is enabled to perform the method performed by the sending device in the foregoing method embodiment, or perform the method performed by the forwarding device in the foregoing method embodiment, or perform the method performed by the receiving device in the foregoing method embodiment.

The communication device, the chip system, the computer storage medium, and the computer program product provided in this application are all configured to perform the corresponding methods provided in the foregoing descriptions. Therefore, for beneficial effects that can be achieved by the electronic device, the chip system, the computer storage medium, and the computer program product, refer to the beneficial effects of the corresponding methods provided in the foregoing descriptions. Details are not described herein again.

The foregoing descriptions about implementations allow a person skilled in the art to clearly understand that, for the purpose of convenient and brief description, division of the foregoing functional modules is used as an example for illustration. In actual application, the foregoing functions can be allocated to different functional modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely example implementations of this application, and are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for adjusting a sending rate of data in near-field communication, wherein the method comprises:
obtaining each of transport layer information of a connection between a sending device and a receiving device, first physical layer channel information of a transmit link on which the sending device is located, and second physical layer channel information of a receive link on which the receiving device is located, wherein obtaining each of the transport layer information comprises receiving a first packet from the receiving device, wherein the second physical layer channel information is encapsulated in a part corresponding to a transport layer in the first packet, and wherein the transport layer information is further encapsulated in the part corresponding to the transport layer in the first packet; and
adjusting the sending rate of the transport layer of the sending device based on the transport layer information, the first physical layer channel information, and the second physical layer channel information.

2. The method of claim 1, wherein the first physical layer channel information of the transmit link comprises at least one of physical layer rate information of the transmit link, a received signal strength indicator (RSSI) of the transmit link, a signal-to-noise ratio (SNR) of the transmit link, an actual service rate of the transmit link, a quantity of access devices of the transmit link, a traffic amount of traffic of an access device of the transmit link, a protocol type of the access device of the transmit link, a type of the access device of the transmit link, frame aggregation information of the transmit link, a bandwidth of the transmit link, a channel quality indicator (CQI) of the transmit link, or a resource of the transmit link, and wherein the second physical layer channel information of the receive link comprises at least one of physical layer rate information of the receive link, an RSSI of the receive link, an SNR of the receive link, an actual service rate of the receive link, a quantity of access devices of the receive link, a traffic amount of traffic of an access device of the receive link, a protocol type of the access device of the receive link, a type of the access device of the receive link, frame aggregation information of the receive link, a bandwidth of the receive link, a CQI of the receive link, and a resource of the receive link.

3. The method of claim 1, wherein the transport layer information comprises at least one of a packet loss rate or a round trip time (RTT).

4. The method of claim 1, wherein the sending rate of the transport layer is less than or equal to an upper rate limit, and wherein the upper rate limit is related to the first physical layer channel information and the second physical layer channel information.

5. The method of claim 4, wherein the sending rate of the transport layer meets the following relationship:

Sendrate=$V_{max}*f_{trans}+Ra$, wherein Sendrate is the sending rate of the transport layer, wherein * represents a multiplication, wherein $V_{max}$ is the upper rate limit, wherein $f_{trans}$ is related to a packet loss rate and a round trip time (RTT) in the transport layer information, and wherein Ra is a first deviation factor.

6. The method of claim 4, wherein the upper rate limit is $V_{max}$, wherein Vmax=$V_1*V_2/(V_1+V_2)$ when there is interference between the transmit link and the receive link, wherein * represents a multiplication, wherein $V_{max}$=min $(V_1, V_2)$ when there is no interference, wherein min (V1, V2) represents a smaller value from V1 and V2, wherein $V_1=C_1*R_1*I_1+D_1$, wherein $V_1$ represents a maximum rate of the transmit link, wherein $R_1$ represents a physical layer rate of the transmit link, wherein $C_1$ represents a valid data proportion of the transmit link, wherein $I_1$ represents an interference factor of the transmit link, wherein $D_1$ represents a second deviation factor, wherein $I_1$ is related to a quantity of access devices of the transmit link and a traffic of an access device of the transmit link, wherein $V_2=C_2*R_2*I_2+D_2$, wherein $V_2$ represents a maximum rate of the receive link, wherein $R_2$ represents a physical layer rate of the receive link, wherein $C_2$ represents a valid data proportion of the receive link, wherein $I_2$ represents an interference factor of the receive link, wherein $D_2$ represents a third deviation factor, and wherein $I_2$ is related to a quantity of access devices of the receive link and a traffic of an access device of the receive link.

7. The method of claim 1, wherein the first packet further comprises a forwarding device flag bit, and wherein the forwarding device flag bit is set so that it indicates that the second physical layer channel information is from a forwarding device.

8. The method of claim 1, further comprising sending a third packet to the receiving device, wherein the third packet comprises a request flag bit, and wherein the request flag bit indicates whether the sending device requests the second physical layer channel information.

9. The method of claim 8, wherein the request flag bit is set so that it indicates that the sending device requests the second physical layer channel information.

10. An apparatus, comprising:
a memory configured to store program instructions; and
a processor coupled to the memory and configured to execute the program instructions that, when executed by the processor, causes the apparatus to:
obtain each of transport layer information of a connection between a sending device and a receiving device, first physical layer channel information of a transmit link on which the sending device is located, and second physical layer channel information of a receive link on which the receiving device is located, wherein obtaining each of the transport layer information comprises receiving a first packet from the receiving device, wherein the second physical layer channel information is encapsulated in a part corresponding to a transport layer in the first packet, and wherein the transport layer information is further encapsulated in the part corresponding to the transport layer in the first packet; and
adjust a sending rate of the transport layer of the sending device based on the transport layer information, the first physical layer channel information, and the second physical layer channel information.

11. The apparatus of claim 10, wherein the first physical layer channel information comprises at least one of physical layer rate information of the transmit link, a received signal strength indicator (RSSI) of the transmit link, a signal-to-noise ratio (SNR) of the transmit link, an actual service rate of the transmit link, a quantity of access devices of the transmit link, a traffic amount of traffic of an access device of the transmit link, a protocol type of the access device of the transmit link, a type of the access device of the transmit link, frame aggregation information of the transmit link, a bandwidth of the transmit link, a channel quality indicator (CQI) of the transmit link, or a resource of the transmit link, and wherein the second physical layer channel information comprises at least one of physical layer rate information of the receive link, an RSSI of the receive link, an SNR of the receive link, an actual service rate of the receive link, a quantity of access devices of the receive link, a traffic amount of traffic of an access device of the receive link, a protocol type of the access device of the receive link, a type of the access device of the receive link, frame aggregation information of the receive link, a bandwidth of the receive link, a CQI of the receive link, or a resource of the receive link.

12. The apparatus of claim 10, wherein the transport layer information comprises at least one of a packet loss rate or a round trip time (RTT).

13. The apparatus of claim 10, wherein the sending rate of the transport layer is less than or equal to an upper rate limit, and wherein the upper rate limit is related to the first physical layer channel information and the second physical layer channel information.

14. A computer program product comprising computer-executable instructions that are stored on a non-transitory computer-readable storage medium and that, when executed by a processor, cause an apparatus to:
obtain each of transport layer information of a connection between a sending device and a receiving device, first physical layer channel information of a transmit link on which the sending device is located, and second physical layer channel information of a receive link on which the receiving device of is located, wherein obtaining each of the transport layer information comprises receiving a first packet from the receiving device, wherein the second physical layer channel information is encapsulated in a part corresponding to a transport layer in the first packet, and wherein the transport layer information is further encapsulated in the part corresponding to the transport layer in the first packet; and
adjust a sending rate of the transport layer of the sending device based on the transport layer information, the first physical layer channel information of the transmit link, and the second physical layer channel information of the receive link.

15. The computer program product of claim 14, wherein the first physical layer channel information comprises at least one of physical layer rate information of the transmit link, a received signal strength indicator (RSSI) of the transmit link, a signal-to-noise ratio (SNR) of the transmit link, an actual service rate of the transmit link, a quantity of access devices of the transmit link, a traffic amount of traffic of an access device of the transmit link, a protocol type of the access device of the transmit link, a type of the access device of the transmit link, frame aggregation information of the transmit link, a bandwidth of the transmit link, a channel quality indicator (CQI) of the transmit link, or a resource of the transmit link, and wherein the second physical layer channel information comprises at least one of physical layer rate information of the receive link, an RSSI of the receive link, an SNR of the receive link, an actual service rate of the receive link, a quantity of access devices of the receive link, a traffic amount of traffic of an access device of the receive link, a protocol type of the access device of the receive link, a type of the access device of the receive link, frame aggregation information of the receive link, a bandwidth of the receive link, a CQI of the receive link, or a resource of the receive link.

16. The computer program product of claim 14, wherein the transport layer information comprises at least one of a packet loss rate or a round trip time (RTT).

17. The computer program product of claim 14, wherein the sending rate of the transport layer is less than or equal to an upper rate limit, and wherein the upper rate limit is related to the first physical layer channel information and the second physical layer channel information.

18. The computer program product of claim 17, wherein the sending rate of the transport layer meets the following relationship:

$$\text{Sendrate} = V_{max} * f_{trans} + Ra,$$

wherein Sendrate is the sending rate of the transport layer, wherein * represents a multiplication, wherein $V_{max}$ is the upper rate limit, wherein $f_{trans}$ is related to a packet loss rate and a round trip time (RTT) in the transport layer information, and wherein Ra is a first deviation factor.

19. The computer program product of claim 14, wherein the first packet further comprises a forwarding device flag bit, and wherein the forwarding device flag bit is set so that it indicates that the second physical layer channel information is from a forwarding device.

20. The computer program product of claim 14, wherein the computer-executable instructions that when executed by the processor further cause the apparatus to send a third packet to the receiving device, wherein the third packet comprises a request flag bit, and wherein the request flag bit indicates whether the sending device requests the second physical layer channel information.

* * * * *